US011996048B2

(12) United States Patent
Chae et al.

(10) Patent No.: US 11,996,048 B2
(45) Date of Patent: May 28, 2024

(54) DISPLAY DEVICE

(71) Applicant: Samsung Display Co., Ltd., Yongin-si (KR)

(72) Inventors: Se Byung Chae, Yongin-si (KR); Seung Kyu Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/143,071

(22) Filed: May 4, 2023

(65) Prior Publication Data

US 2023/0290308 A1 Sep. 14, 2023

Related U.S. Application Data

(63) Continuation of application No. 17/736,040, filed on May 3, 2022, now Pat. No. 11,676,536.

(30) Foreign Application Priority Data

May 7, 2021 (KR) ........................ 10-2021-0059497

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0819* (2013.01);
(Continued)

(58) Field of Classification Search
None
See application file for complete search history.

(56) References Cited

U.S. PATENT DOCUMENTS 6,919,697 B2 7/2005 Jang
10,643,537 B2 5/2020 Kwon et al.
(Continued)

FOREIGN PATENT DOCUMENTS

KR 10-0900463 6/2009
KR 10-2018-0078935 7/2018
(Continued)

OTHER PUBLICATIONS

Notice of Allowance dated Feb. 3, 2023, in U.S. Appl. No. 17/736,040.

*Primary Examiner* — Stephen T. Reed
(74) *Attorney, Agent, or Firm* — CANTOR COLBURN LLP

(57) ABSTRACT

A display device includes a display panel including pixels coupled to a first scan line and a data line, a power supply to supply voltages, a scan driver to provide a first scan signal to the first scan line a plurality of times for a first frame period (FFP), a data driver to supply a data signal to the data line, and a timing controller to control driving of components. The FFP includes: a first active period (FAP), in which the data signal is supplied; and a first blank period (FBP), in which the data signal is not supplied. The power supply provides on-bias power having a first voltage level (FVL) in the FAP, and provides on-bias power having a second voltage level (SVL) in the FBP. The FBP following the FAP includes a first dimming period in which the on-bias power gradually changes from the FVL to the SVL.

20 Claims, 18 Drawing Sheets

(52) U.S. Cl.
CPC ............... *G09G 2300/0842* (2013.01); *G09G 2300/0861* (2013.01); *G09G 2310/08* (2013.01); *G09G 2320/0214* (2013.01); *G09G 2320/0233* (2013.01); *G09G 2320/045* (2013.01)

(56) References Cited

U.S. PATENT DOCUMENTS

| | | | | |
|---|---|---|---|---|
| 10,916,198 | B2 | 2/2021 | Lin et al. | |
| 2020/0357362 | A1* | 11/2020 | Shin | G09G 3/3233 |
| 2020/0388228 | A1* | 12/2020 | Oh | G09G 5/373 |
| 2020/0394984 | A1* | 12/2020 | Park | G09G 3/3291 |
| 2021/0304660 | A1* | 9/2021 | Maruyama | G09G 3/3266 |
| 2022/0148516 | A1* | 5/2022 | Hwang | H01L 27/1255 |
| 2022/0157263 | A1* | 5/2022 | Moon | G09G 3/3291 |

FOREIGN PATENT DOCUMENTS

| | | |
|---|---|---|
| KR | 10-2019-0047332 | 5/2019 |
| KR | 10-2020-0087711 | 7/2020 |

* cited by examiner

DISPLAY DEVICE

CROSS-REFERENCE TO RELATED APPLICATIONS

This application is a Continuation of U.S. patent application Ser. No. 17/736,040, filed May 3, 2022, which claims priority to and the benefit of Korean Patent Application No. 10-2021-0059497, filed May 7, 2021, each of which is hereby incorporated by reference for all purposes as if fully set forth herein.

BACKGROUND

Field

Various embodiments generally relate to a display device.

Discussion

A display device includes a display panel (or a pixel component) including a plurality of pixels and a driver for driving the display panel. The driver displays an image on the display panel using an image signal received from a graphics processor, such as an external graphics processor. The graphics processor generates an image signal by rendering source data, and the rendering time taken to generate an image signal corresponding to a single frame may vary depending on the type or characteristics of an image. The driver may change a driving frequency (or a frame frequency) in response to the rendering time.

A pixel may include a pixel circuit, including a plurality of transistors and capacitors, and a light-emitting element. The pixel circuit may be supplied with a data voltage from a data line when a scan signal is supplied from a scan line, and may supply the current of a driving transistor, which is set based on the data voltage, to the light-emitting element. The light-emitting element may emit light with intensity corresponding to the current of the driving transistor.

When a display device is driven at a low driving frequency, a single frame may include an active period, in which a data signal is written, and a blank period, in which no data signal is written. Due to the leakage current and/or the hysteresis characteristics of the driving transistor, the luminance of the display device may increase for the blank period compared to the active period. To solve this problem, the display device may supply an on-bias voltage (or an initialization voltage) to the driving transistor a plurality of times (e.g., twice) in each of the active period and the blank period. Here, the magnitude of the on-bias voltage (or the initialization voltage) supplied in the active period may be set to be different from the magnitude of the on-bias voltage (or the initialization voltage) supplied in the blank period.

However, in a case that the on-bias voltage (or the initialization voltage) is supplied a plurality of times (e.g., twice) in each of the active period and the blank period, the timing of supply of the on-bias voltage (or the initialization voltage) in a specific period (e.g., the active period) may overlap the following specific period (e.g., the blank period). Accordingly, during a single frame, both the on-bias voltage (or the initialization voltage) of the active period and the on-bias voltage (or the initialization voltage) of the blank period may be applied to a region starting from a certain point of the display panel (e.g., from a middle pixel row), which generates a luminance difference across a boundary at the certain point of the display panel.

The above information disclosed in this section is only for understanding the background of the inventive concepts, and, therefore, may contain information that does not form prior art.

SUMMARY

Various embodiments are directed to a display device capable of preventing display quality degradation arising from the leakage current and/or a change in the hysteresis characteristic of a driving transistor.

Additional aspects will be set forth in the detailed description which follows, and, in part, will be apparent from the disclosure, or may be learned by practice of the inventive concepts.

According to an embodiment, a display device includes a display panel, a power supply, a scan driver, a data driver, and a timing controller. The display panel includes pixels coupled to a first scan line and a data line. The power supply is configured to supply a voltage of driving power, a voltage of on-bias power, a voltage of first initialization power, and a voltage of second initialization power to the display panel. The scan driver is configured to provide a first scan signal to the first scan line a plurality of times for a first frame period. The data driver is configured to supply a data signal to the data line. The timing controller is configured to control driving of the power supply, the scan driver, and the data driver. The first frame period includes: a first active period, in which the data signal is supplied to the display panel; and a first blank period, in which the data signal is not supplied to the display panel. The power supply is configured to: provide on-bias power having a first voltage level in the first active period; and provide on-bias power having a second voltage level different from the first voltage level in the first blank period. The first blank period following the first active period includes a first dimming period in which the on-bias power gradually changes from the first voltage level to the second voltage level.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF SOME EMBODIMENTS

Figure 1:
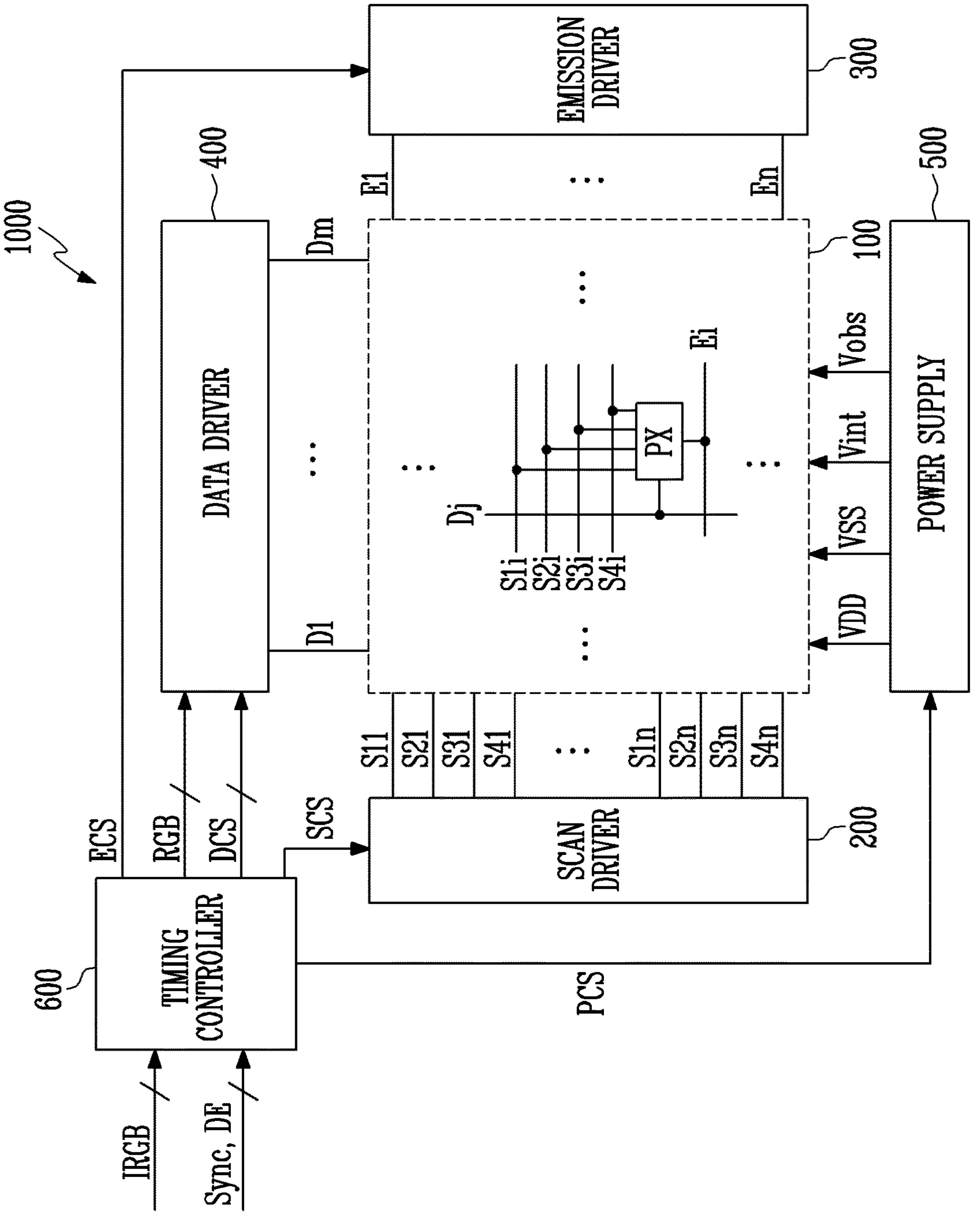
FIG. 1 is a block diagram illustrating a display device according to an embodiment.

In the following description, for the purposes of explanation, numerous specific details are set forth to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

FIG. 1 is a block diagram illustrating a display device according to an embodiment.

Referring to FIG. 1, the display device 1000 may include a display panel 100, a scan driver 200, an emission driver 300, a data driver 400, a power supply 500, and a timing controller 600.

The display device 1000 may display an image at any of various frame frequencies (e.g., a refresh rate, a driving frequency, or a screen refresh rate) depending on driving conditions. The frame frequency is the number of times per second a data voltage is actually written to the driving transistor of a pixel PX. For example, the frame frequency is referred to as a screen scan rate or a screen refresh frequency, and indicates the number of times per second a displayed screen is refreshed.

In an embodiment, the output frequency of a fourth scan signal supplied to a fourth scan line S4*i* for the data driver 400 and/or for the supply of a data signal may be changed in response to the frame frequency. For example, the frame frequency for playing video may be equal to or greater than about 60 Hz (e.g., 120 Hz). In this case, the fourth scan signal may be supplied to each horizontal line (each pixel row) 60 times per second.

In an embodiment, the display device 1000 may adjust the output frequencies of the scan driver 200 and the emission driver 300 depending on driving conditions, and may adjust the output frequency of the data driver 400 in response thereto. For example, the display device 1000 may display an image in response to any of various frame frequencies ranging from, for instance, 1 Hz to 120 Hz. However, this is merely an example, and the display device 1000 may also display an image at a frame frequency equal to or greater than 120 Hz (e.g., 240 Hz, 480 Hz, etc.).

The display device 1000 may operate at any of various frame frequencies. In the case of low-frequency driving, an image defect, such as a flicker or the like, may appear due to a current leakage in a pixel. Also, when the display device 1000 is driven at various frame frequencies, a change in the response speed may be caused due to a change in the bias state of a driving transistor, the shift of a threshold voltage thereof depending on a change in the hysteresis characteristic, and the like, whereby a residual image, such as image blurring or the like, may appear.

To improve image quality, a single frame period of a pixel PX may include a single active period and at least one blank period depending on the frame frequency. Operations in the active period and the blank period will be described in more detail with reference to FIGS. 4 and 5.

The display panel 100 may include scan lines S11 to S1*n*, S21 to S2*n*, S31 to S3*n*, and S41 to S4*n*, emission control lines E1 to En, and data lines D1 to Dm, as well as pixels PX coupled to the scan lines S11 to S1*n*, S21 to S2*n*, S31 to S3*n*, and S41 to S4*n*, the emission control lines E1 to En, and the data lines D1 to Dm (m and n being integers greater than 1). Each of the pixels PX may include a driving transistor and a plurality of switching transistors. The pixels PX may be supplied with voltages, such as first driving power VDD, second driving power VSS, on-bias power Vobs, and initialization power Vint from the power supply 500.

In an embodiment, signal lines coupled to the pixel PX may be variously configured in response to the circuit structure of the pixel PX.

The timing controller 600 may be supplied with input image data IRGB and control signals (Sync and DE) from a host system, such as an application processor (AP), through a predetermined interface.

The timing controller 600 may generate a first control signal SCS, a second control signal ECS, a third control signal DCS, and a fourth control signal PCS based on the input image data IRGB, a synchronization signal Sync (e.g., a vertical synchronization signal, a horizontal synchronization signal, and/or the like), a data enable signal DE, a clock signal, and/or the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may rearrange the input image data IRGB and supply the same to the data driver 400.

The scan driver 200 may receive the first control signal SCS from the timing controller 600, and may supply a first scan signal, a second scan signal, a third scan signal, and a fourth scan signal to the first scan lines S11 to S1*n*, the second scan lines S21 to S2*n*, the third scan lines S31 to S3*n*, and the fourth scan lines S41 to S4*n*, respectively, based on the first control signal SCS.

The first to fourth scan signals may be set to have a gate-on voltage (e.g., a low voltage) corresponding to the type of transistor to which the corresponding scan signals are supplied. The transistor that receives the scan signal may be set to a turn-on state when the scan signal is supplied thereto. For example, the gate-on voltage of a scan signal supplied to a P-channel metal oxide semiconductor (PMOS) transistor may have a logic low level, and the gate-on voltage of a scan signal supplied to an N-channel metal oxide semiconductor (NMOS) transistor may have a logic high level. Hereinafter, "a scan signal is supplied" may be understood as the supply of a scan signal having a logic level with which the transistor controlled thereby is turned on.

The emission driver 300 may supply an emission control signal to the emission control lines E1 to En based on the second control signal ECS. For example, the emission control signal may be sequentially supplied to the emission control lines E1 to En.

The emission control signal may be set to have a gate-off voltage (e.g., a high voltage). The transistor that receives the emission control signal may be turned off when the emission control signal is supplied thereto, and may be set to a turn-on state in other cases. Hereinafter, "an emission control signal is supplied" may be understood as the supply of an emission control signal having a logic level with which the transistor controlled thereby is turned off.

In FIG. 1, the scan driver 200 and the emission driver 300 are illustrated as individual components for convenience of description, but embodiments are not limited thereto. Depending on the design, the scan driver 200 may include a plurality of scan drivers, each of which supplies at least one of the first to fourth scan signals. Also, at least portion of the scan driver 200 and the emission driver 300 may be integrated into a driving circuit, a module, or the like.

The data driver 400 may receive the third control signal DCS and image data RGB from the timing controller 600. The data driver 400 may convert the image data RGB in a digital format into an analog data signal (a data voltage). The data driver 400 may supply the data signal to the data lines D1 to Dm in response to the third control signal DCS. Here, the data signal supplied to the data lines D1 to Dm may be supplied and be synchronized with the fourth scan signal supplied to the fourth scan lines S41 to S4*n*.

The power supply 500 may supply the voltage of the first driving power VDD and the voltage of the second driving power VSS to the display panel 100 to drive the pixel PX. The voltage level of the second driving power VSS may be lower than the voltage level of the first driving power VDD. For example, the voltage of the first driving power VDD may be a positive voltage, and the voltage of the second driving power VSS may be a negative voltage, but embodiments are not limited thereto.

The power supply 500 may supply the voltage of the on-bias power Vobs and the voltage of the initialization power Vint to the display panel 100. The initialization power Vint may include initialization power output with different voltage levels (e.g., Vint1 and Vint2 of FIG. 3).

The on-bias power Vobs may be power for supplying a predetermined bias voltage to the source electrode and/or the drain electrode of a driving transistor included in the pixel PX. The on-bias power Vobs may be a positive voltage. However, the voltage level of the on-bias power Vobs is not limited thereto, and the voltage level of the on-bias power Vobs may be a negative voltage.

The initialization power Vint may be power for initializing the pixel PX. For example, a driving transistor and/or a light-emitting element included in the pixel PX may be initialized by the voltage of the initialization power Vint. The initialization power Vint may be a negative voltage.

In an embodiment, the power supply 500 may change the voltage level of at least one of the voltage of the on-bias power Vobs and the voltage of the initialization power Vint and supply the same to the display panel 100 within a single frame period. Accordingly, the bias state of the driving transistor included in the pixel PX may be controlled.

Figure 2:
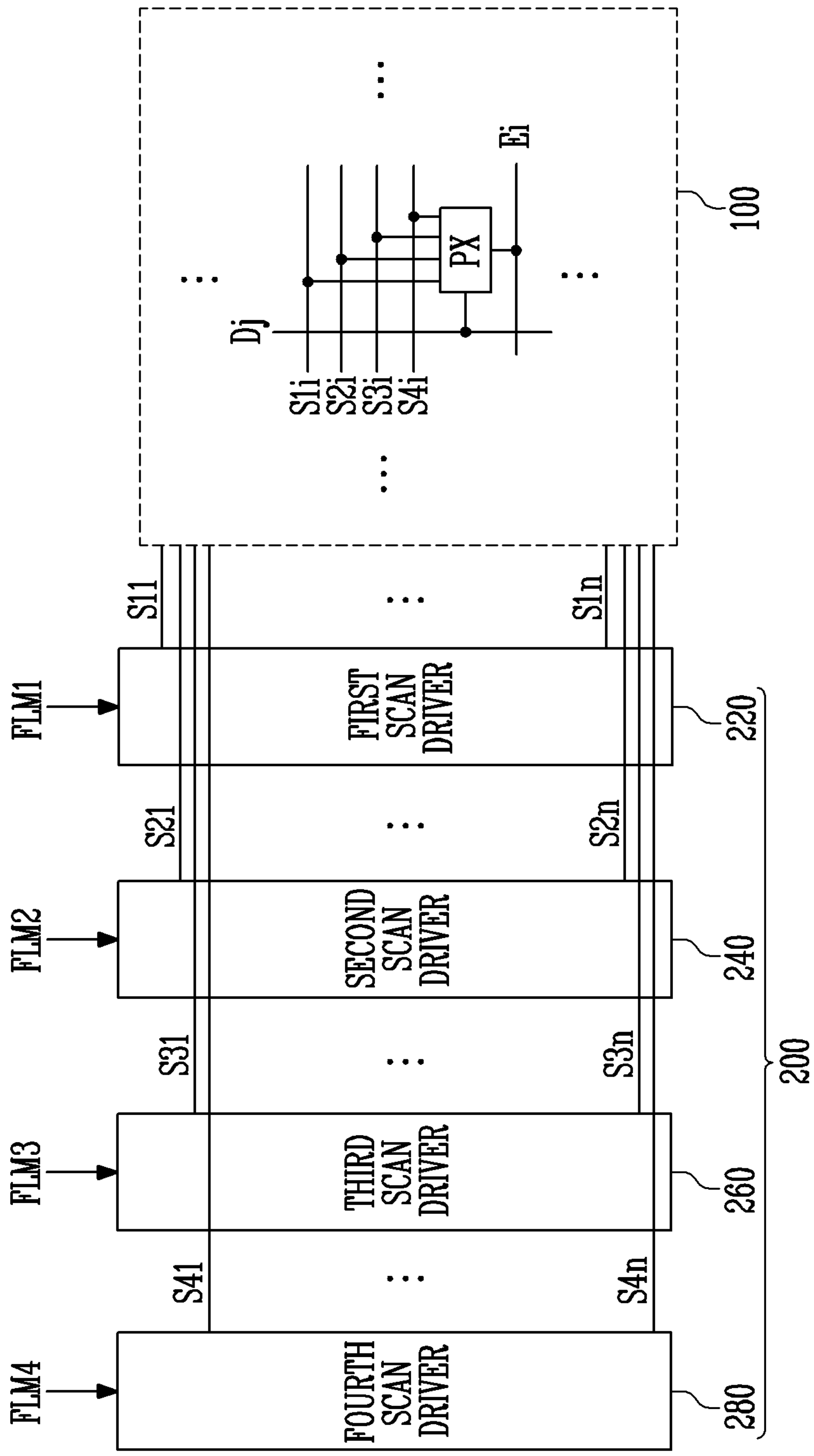
FIG. 2 is a view illustrating an example of a scan driver included in the display device of FIG. 1 according to an embodiment.

FIG. 2 is a view illustrating an example of a scan driver included in the display device of FIG. 1 according to an embodiment.

Referring to FIGS. 1 and 2, the scan driver 200 may include a first scan driver 220, a second scan driver 240, a third scan driver 260, and a fourth scan driver 280.

The first control signal SCS may include first to fourth scan start signals FLM1 to FLM4. The first to fourth scan start signals FLM1 to FLM4 may be supplied to the first to fourth scan drivers 220, 240, 260 and 280, respectively.

The width, the supply timing, and the like of the first to fourth scan start signals FLM1 to FLM4 may be set depending on the driving conditions of the pixel PX and a frame frequency. The first to fourth scan signals may be output based on the first to fourth scan start signals FLM1 to FLM4, respectively. For example, the signal width of at least one of the first to fourth scan signals may be different from those of the other signals.

The first scan driver 220 may sequentially supply the first scan signal to the first scan lines S11 to S1*n* in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Figure 3:
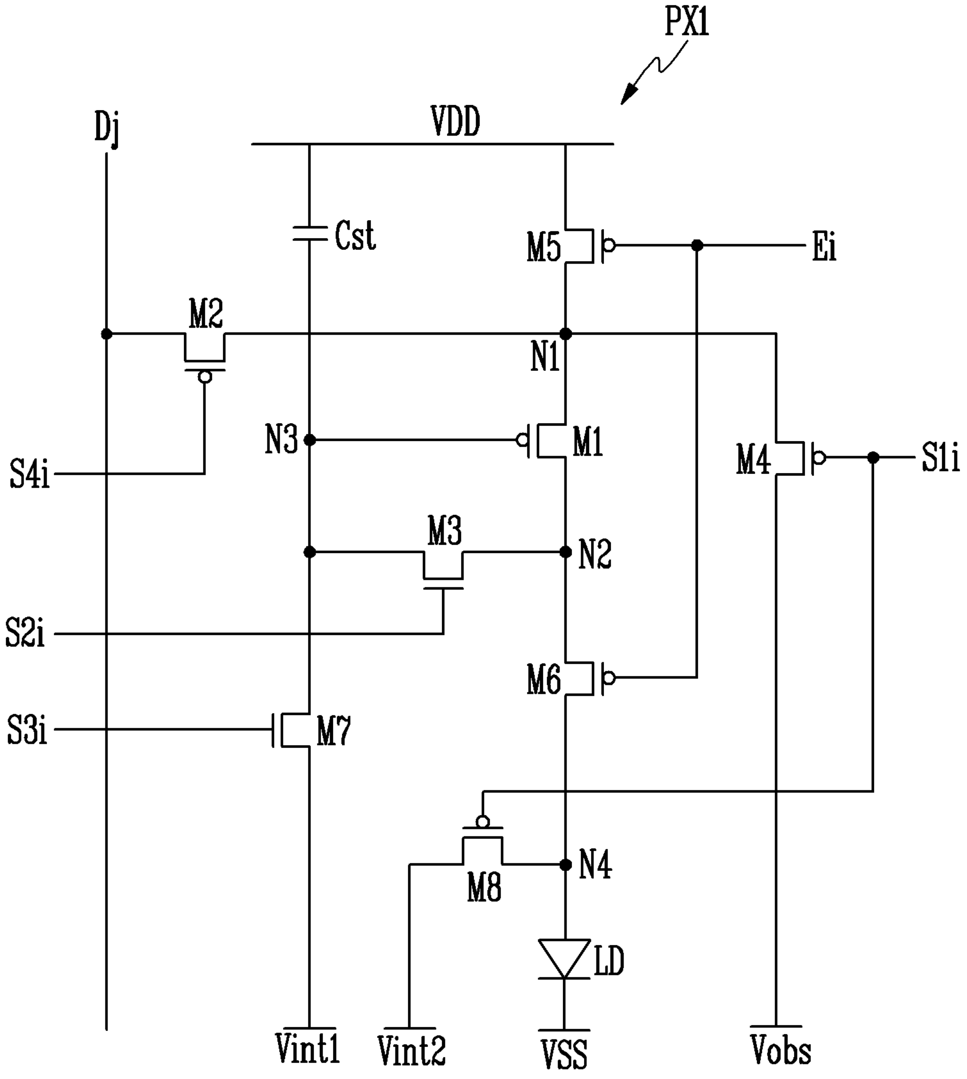
FIG. 3 is a circuit diagram illustrating an example of a pixel included in the display device of FIG. 1 according to an embodiment.

FIG. 3 is a circuit diagram illustrating an example of a pixel included in the display device of FIG. 1 according to an embodiment.

In FIG. 3, the pixel PX1 located in the i-th horizontal line (or the i-th pixel row) and coupled to the j-th data line Dj is illustrated for convenience of description (i and j being natural numbers). The pixel PX1 illustrated in FIG. 3 may be substantially the same as the pixel PX of FIG. 1.

Referring to FIGS. 1 and 3, the pixel PX1 may include a light-emitting element LD, first to eighth transistors M1 to M8, and a storage capacitor Cst.

The first electrode (e.g., the anode electrode or the cathode electrode) of the light-emitting element LD may be coupled to the sixth transistor M6 (or a fourth node N4), and the second electrode (e.g., the cathode electrode or the anode electrode) thereof may be coupled to the source of the second driving power VSS. The light-emitting element LD may generate light of predetermined luminance in response to the amount of current (e.g., driving current) supplied from the first transistor M1.

In an embodiment, the light-emitting element LD may be an organic light-emitting diode including an organic light-emitting layer. In an embodiment, the light-emitting element LD may be an inorganic light-emitting element formed of an inorganic material. In an embodiment, the light-emitting element LD may be a light-emitting element formed of a combination of an inorganic material and an organic material. Alternatively, the light-emitting element LD may have a form in which a plurality of inorganic light-emitting elements is coupled in parallel and/or series to each other between the source of the second driving power VSS and the sixth transistor M6.

The first electrode of the first transistor M1 (or the driving transistor) may be coupled to a first node N1, and the second electrode thereof may be coupled to a second node N2. The gate electrode of the first transistor M1 may be coupled to a third node N3. The first transistor M1 may control an amount of current flowing from the source of the first driving power VDD to the source of the second driving power VSS via the light-emitting element LD in response to the voltage of the third node N3. To this end, the first driving power VDD may be set to a higher voltage than the second driving power VSS.

The second transistor M2 may be coupled between the j-th data line Dj (referred to as a data line hereinbelow) and the first node N1. The gate electrode of the second transistor M2 may be coupled to the i-th fourth scan line S4*i* (referred to as a fourth scan line hereinbelow). The second transistor M2 is turned on in response to the fourth scan signal being supplied to the fourth scan line S4*i*, thereby electrically connecting the data line Dj to the first node N1.

The third transistor M3 may be coupled between the second electrode of the first transistor M1 (or the second node N2) and the gate electrode of the first transistor M1 (or the third node N3). The gate electrode of the third transistor M3 may be coupled to the i-th second scan line S2*i* (referred to as a second scan line hereinbelow). The third transistor M3 is turned on in response to the second scan signal being supplied to the second scan line S2*i*, thereby electrically connecting the second electrode of the first transistor M1 to the gate electrode thereof (or electrically connecting the second node N2 to the third node N3). For instance, the timing to connect the second electrode (e.g., the drain electrode) of the first transistor M1 to the gate electrode of the first transistor M1 may be controlled by the second scan signal. In response to the third transistor M3 being turned on, the first transistor M1 may be coupled in a diode form.

The fourth transistor M4 is turned on in response to a first scan signal supplied to the i-th first scan line S1*i* (referred to as a first scan line hereinbelow), thereby supplying the voltage of the on-bias power Vobs to the first transistor M1. In an embodiment, the fourth transistor M4 may be coupled between the first node N1 (or the first electrode of the first transistor M1) and the source of the on-bias power Vobs. Here, the timing to supply the voltage of the on-bias power Vobs to the first node N1 may be controlled by the first scan signal.

The gate electrode of the fourth transistor M4 may be coupled to the first scan line. In response to the fourth transistor M4 being turned on, the voltage of the on-bias power Vobs may be supplied to the first node N1. In an embodiment, the voltage of the on-bias power Vobs may have a level similar to that of a data voltage of a black grayscale. For example, the voltage of the on-bias power Vobs may be about 5 V to 7 V.

In response to the fourth transistor M4 being turned on, a predetermined high voltage may be applied to the first electrode (e.g., the source electrode) of the first transistor M1. Here, if the third transistor M3 is in a turned-off state, the first transistor M1 may have an on-bias state (e.g., a state in which it can be turned on).

In an embodiment, the voltage level of the on-bias power Vobs may vary in a single frame period. For example, the on-bias power Vobs may have a first voltage level in an active period of a single frame period, and may have a second voltage level in a blank period thereof. For instance, the on-bias power Vobs may have different voltage levels in the active period and the blank period. Here, the second voltage level may be higher than the first voltage level. In an example, when a single frame period includes a single active period and a plurality of blank periods, the on-bias power Vobs may have a first voltage level in the single active period, may have a second voltage level in the first blank period among the blank periods, and may have a third voltage level in the second blank period among the blank periods. For instance, the on-bias power Vobs may have different voltage levels in the active period and the blank period, and may also have different voltage levels in the first blank period and the second blank period among the blank periods. Here, the third voltage level may be higher than the second voltage level. Accordingly, in a low-frequency driving state in which the length of a single frame period increases, the voltage level of the on-bias power (Vobs) for applying an on-bias voltage to the first electrode (e.g., the source electrode) of the first transistor M1 is changed, whereby display quality degradation arising from a change in the hysteresis characteristic of the first transistor M1 may be improved.

In some embodiments, the voltage levels of the on-bias power Vobs may be different in active periods respectively included in a plurality of frame periods. For example, when a first frame period includes only an active period, the active period of a second frame period subsequent to the first frame period may immediately follow the active period of the first frame period. Here, the voltage level of the on-bias power Vobs in the active period of the first frame period may be different from that in the active period of the second frame period. For example, the voltage level of the on-bias power Vobs may be a first voltage level in the active period of the first frame period, but may be a 1_1-th voltage level in the active period of the second frame period.

The fifth transistor M5 may be coupled between the source of the first driving power VDD and the first node N1. The gate electrode of the fifth transistor M5 may be coupled to the i-th emission control line Ei (referred to as an emission control line hereinbelow). The fifth transistor M5 is turned off in response an emission control signal being supplied to the emission control line Ei, and is turned on in other cases.

The sixth transistor M6 may be coupled between the second electrode of the first transistor M1 (or the second node N2) and the first electrode of the light-emitting element LD (or the fourth node N4). The gate electrode of the sixth transistor M6 may be coupled to the emission control line Ei. The sixth transistor M6 may be controlled in substantially the same manner as the fifth transistor M5.

In FIG. 3, the fifth transistor M5 and the sixth transistor M6 are illustrated as being coupled to the same emission control line Ei, but this is merely an example. The fifth transistor M5 and the sixth transistor M6 may be respectively coupled to separate emission control lines to which different emission control signals are supplied.

The seventh transistor M7 may be coupled between the third node N3 and the source of the first initialization power Vint1. The gate electrode of the seventh transistor M7 may be coupled to the i-th third scan line S3*i* (referred to as a third scan line hereinbelow). The seventh transistor M7 is turned on in response to a third scan signal being supplied to the third scan line S3*i*, thereby supplying the voltage of the first initialization power Vint1 to the third node N3. Here, the voltage of the first initialization power Vint1 may be set to a lower voltage than the data signal supplied to the data line Dj. Accordingly, the gate voltage of the first transistor M1 may be initialized to the voltage of the first initialization power Vint1 by turning on the seventh transistor M7.

The eighth transistor M8 may be coupled between the first electrode of the light-emitting element LD (or the fourth node N4) and the source of the second initialization power Vint2. In an embodiment, the gate electrode of the eighth transistor M8 may be coupled to the first scan line S1*i*. The eighth transistor M8 is turned on in response to the first scan signal being supplied to the first scan line S1*i*, thereby supplying the voltage of the second initialization power Vint2 to the first electrode of the light-emitting element LD.

When the voltage of the second initialization power Vint2 is supplied to the first electrode of the light-emitting element LD, the parasitic capacitor of the light-emitting element LD may be discharged. The parasitic capacitor is discharged (e.g., the residual voltage therein is removed), whereby unintended emission (e.g., slight emission) of light may be prevented. In this manner, the capability of the pixel PX1 to represent black may be improved.

In an embodiment, the voltage level of the second initialization power Vint2 may vary in a single frame period. For example, the second initialization power Vint2 may have a third voltage level (VI1, see, e.g., FIG. 6A) in an active period of a single frame period, and may have a fourth voltage level (VI2, see, e.g., FIG. 6A) in a blank period thereof. For instance, the second initialization power Vint2 may have different voltage levels in the active period and the blank period. Here, the fourth voltage level may be lower than the third voltage level. In an example, when a single frame period includes a single active period and a plurality of blank periods, the second initialization power Vint2 may have a third voltage level in the single active period, may have a fourth voltage level in the first blank period among the blank periods, and may have a sixth voltage level (VI3, see, e.g., FIG. 7A) in the second blank period among the blank periods. For example, the second initialization power Vint2 may have different voltage levels in the active period and the blank period, and may also have different voltage levels in the first blank period and the second blank period among the blank periods. Here, the sixth voltage level may be lower than the fourth voltage level. Accordingly, in a low-frequency driving state in which the length of a single frame period increases, the voltage level of the second initialization power Vint2 applied to the first electrode (e.g., the anode electrode) of the light-emitting element LD is changed, whereby an initialization amount for the parasitic capacitor of the light-emitting element LD is changed. In this manner, luminance fluctuation arising from a change in the hysteresis characteristic of the first transistor M1 is prevented, whereby display quality degradation may be improved.

In some embodiments, the voltage levels of the second initialization power Vint2 may be different in active periods respectively included in a plurality of frame periods. For example, when a first frame period includes only an active period, the active period of a second frame period subsequent to the first frame period may immediately follow the active period of the first frame period. Here, the voltage level of the second initialization power Vint2 in the active period of the first frame period may be different than in the active period of the second frame period. For example, the voltage level of the second initialization power Vint2 may be a third voltage level in the active period of the first frame period, and may be a 3_1-th voltage level (VI1_1, see, e.g., FIG. 9A) in the active period of the second frame period.

The first initialization power Vint1 and the second initialization power Vint2 may have different voltages. For instance, the voltage for initializing the third node N3 and the voltage for initializing the fourth node N4 may be set differently from each other.

In a low-frequency driving state in which the length of a single frame period increases, when the voltage of the first initialization power Vint1, which is supplied to the third node N3, is excessively low, a strong on-bias is applied to the first transistor M1, whereby the threshold voltage of the first transistor M1 in the corresponding frame period is shifted. Such a hysteresis characteristic may cause a flicker phenomenon in a low-frequency driving state. Therefore, in a display device driven at a low frequency, the voltage of the first initialization power Vint1 may be higher than the voltage of the second driving power VSS.

However, when the voltage of the second initialization power Vint2, which is supplied to the fourth node N4, becomes higher than a predetermined reference, the parasitic capacitor of the light-emitting element LD may be charged, rather than being discharged. Therefore, the voltage of the second initialization power Vint2 should be low enough to discharge the parasitic capacitor of the light-emitting element LD (e.g., should be low enough to remove the voltage of the parasitic capacitor). For example, in consideration of the threshold voltage of the light-emitting element LD, the voltage of the second initialization power Vint2 may be set such that the voltage of the second initialization power Vint2 is lower than the sum of the threshold voltage of the light-emitting element LD and the voltage of the second driving power VSS.

However, this is merely an example, and the voltage of the first initialization power Vint1 and the voltage of the second initialization power Vint2 may be variously set. For example, the voltage of the first initialization power Vint1 and the voltage of the second initialization power Vint2 may be substantially equal.

The storage capacitor Cst is coupled between the source of the first driving power VDD and the third node N3. The storage capacitor Cst may store the voltage applied to the third node N3.

According to some embodiments, the first transistor M1, the second transistor M2, the fourth transistor M4, the fifth transistor M5, the sixth transistor M6, and the eighth transistor M8 may be formed of polysilicon semiconductor transistors. For example, the first transistor M1, the second transistor M2, the fourth transistor M4, the fifth transistor M5, the sixth transistor M6, and the eighth transistor M8 may include a polysilicon semiconductor layer, which is formed through a low-temperature polysilicon (LTPS) process, as an active layer (or channel). Also, the first transistor M1, the second transistor M2, the fourth transistor M4, the fifth transistor M5, the sixth transistor M6, and the eighth transistor M8 may be P-type transistors (e.g., PMOS transistors). Accordingly, the gate-on voltage for turning on the first transistor M1, the second transistor M2, the fourth transistor M4, the fifth transistor M5, the sixth transistor M6, and the eighth transistor M8 may have a logic low level. Because the polysilicon semiconductor transistor has the advantage of fast response time, it may be applied to a switching element in which fast switching is to be implemented.

The third transistor M3 and the seventh transistor M7 may be formed of oxide semiconductor transistors. For example, the third transistor M3 and the seventh transistor M7 may be N-type oxide semiconductor transistors (e.g., NMOS transistors), and may include an oxide semiconductor layer as an active layer. Accordingly, the gate-on voltage for turning on the third transistor M3 and the seventh transistor M7 may have a logic high level.

The oxide semiconductor transistor may be formed through a low-temperature process, and has low charge mobility compared to a polysilicon semiconductor transistor. For example, the oxide semiconductor transistor has a superior off-current characteristic. In a case that the third transistor M3 and the seventh transistor M7 are formed of oxide semiconductor transistors, a leakage current caused due to low-frequency driving may be minimized, whereby display quality may be improved.

However, the first to eighth transistors M1 to M8 are not limited to the above description, and at least one of the first transistor M1, the second transistor M2, the fourth transistor M4, the fifth transistor M5, the sixth transistor M6, and the eighth transistor M8 may be formed of an oxide semiconductor transistor, and/or at least one of the third transistor M3 and the seventh transistor M7 may be formed of a polysilicon semiconductor transistor.

Figure 4:
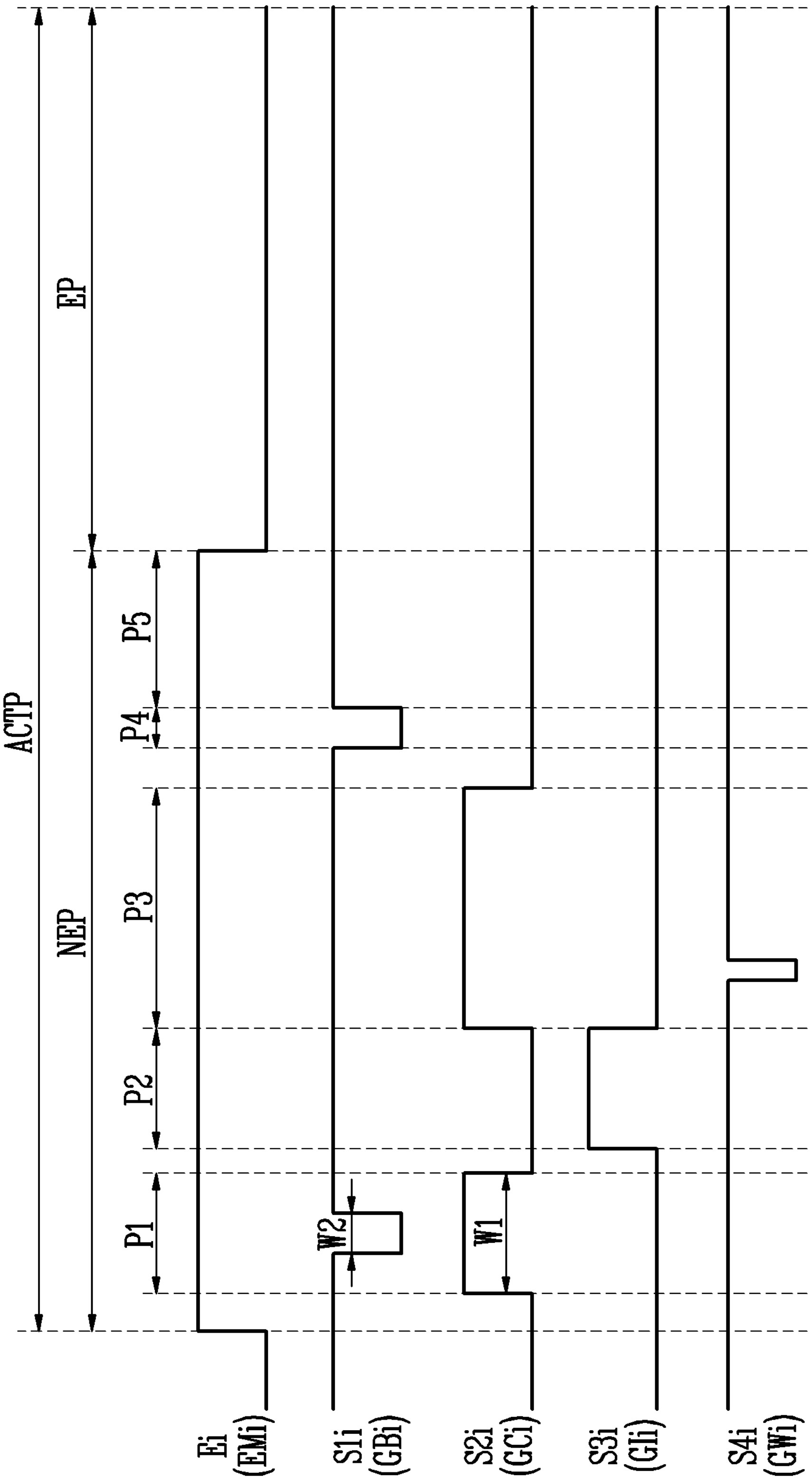
FIG. 4 is a timing diagram illustrating an example of signals supplied to the pixel of FIG. 3 according to an embodiment.
Figure 5:
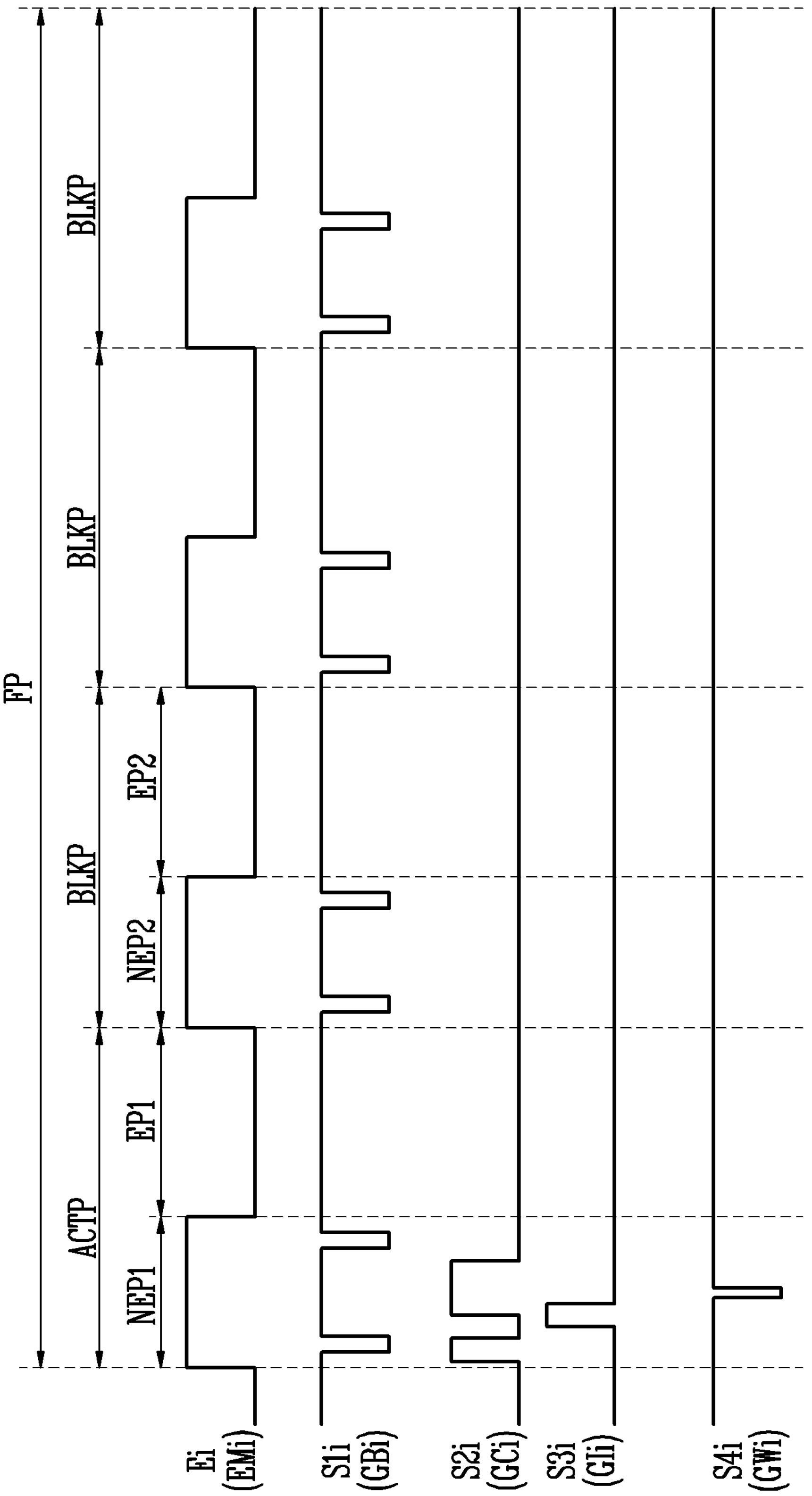
FIG. 5 is a timing diagram illustrating an example of signals supplied to the pixel of FIG. 3 for a single frame period according to an embodiment.

FIG. 4 is a timing diagram illustrating an example of signals supplied to the pixel of FIG. 3 according to an embodiment. FIG. 5 is a timing diagram illustrating an example of signals supplied to the pixel of FIG. 3 for a single frame period according to an embodiment.

Referring to FIGS. 3 to 5, in the case of variable-frequency driving for controlling a frame frequency, a single frame period FP may include an active period ACTP and a blank period BLKP.

The active period ACTP may include a first non-emission period NEP1 and a first emission period EP1. The blank period BLKP may include a second non-emission period NEP2 and a second emission period EP2. The non-emission period NEP and the emission period EP of FIG. 4 may be the first non-emission period NEP1 and the first emission period EP1 of FIG. 5, respectively.

The active period ACTP may include a period during which a data signal, actually corresponding to an output image, is written. For example, when a still image is displayed with low-frequency driving, a data signal may be written for each active period ACTP.

As illustrated in FIG. 5, an emission control signal EMi may be supplied to an emission control line Ei at a first frequency greater than a frame frequency. A third scan signal GIi and a fourth scan signal GWi may be supplied at a second frequency lower than the first frequency. For example, the first frequency may be 240 Hz, and the second frequency may be 60 Hz. Here, the frequency of the third scan signal GIi and that of the fourth scan signal GWi may be substantially equal to the frame frequency.

However, this is merely an example, and the second frequency may be equal to or lower than 60 Hz. As the second frequency is lower or as the difference between the first frequency and the second frequency is greater, the number of repetitions of the blank period BLKP (e.g., the number of blank periods BLKP) in a frame period FP may increase. For example, depending on the frame frequency, the frame period FP may include a single active period ACTP and a plurality of consecutive blank periods BLKP.

In an embodiment, a second scan signal GCi may be supplied only in the first non-emission period NEP1. The second scan signal GCi may be supplied to a second scan line S2*i* a plurality of times in the first non-emission period NEP1.

In an embodiment, a first scan signal GBi may be supplied in the first non-emission period NEP1 and the second non-emission period NEP2. The first scan signal GBi may be supplied to a first scan line S1*i* a plurality of times in the first non-emission period NEP1. Also, the first scan signal GBi may be supplied to the first scan line S1*i* a plurality of times in the second non-emission period NEP2.

The first scan signal GBi may be a signal for controlling the first transistor M1 to be in an on-bias state. For example, when the fourth transistor M4 is turned on in response to the first scan signal GBi, the voltage of the on-bias power Vobs may be supplied to the first node N1. Also, the first scan signal GBi may be a signal for initializing the light-emitting element LD. For example, when the eighth transistor M8 is turned on in response to the first scan signal GBi, the voltage of the second initialization power Vint2 may be supplied to the fourth node N4.

The display device according to some embodiments may periodically apply the voltage of the on-bias power Vobs to the first electrode (or the source electrode) of the first transistor M1 using the fourth transistor M4. In response to the voltage of the on-bias power Vobs being supplied to the source electrode of the first transistor M1, the first transistor M1 may be set to an on-bias state, and the threshold voltage characteristic thereof may be changed. Accordingly, in a low-frequency driving state, deterioration that is caused because the characteristic of the first transistor M1 is fixed to a specific state may be prevented.

In an embodiment, the voltage levels of the on-bias power Vobs may be different in the active period ACTP and the blank period BLKP of a single frame period FP. Here, the voltage level of the on-bias power Vobs may gradually change in response to the transition between the same types of periods or between different types of periods among the active period ACTP and the blank periods BLKP. For example, regarding the transition from the active period ACTP to the blank period BLKP, the blank period BLKP may include a dimming period, which starts from the start point of the blank period BLKP and ends at a preset point and in which the voltage level of the on-bias power Vobs gradually increases. Accordingly, display quality degradation arising from a change in the hysteresis characteristic of the first transistor M1 may be improved.

The display device according to some embodiments may periodically apply the voltage of the second initialization power Vint2 to the first electrode (or the anode electrode) of the light-emitting element LD using the eighth transistor M8. When the voltage of the second initialization power Vint2 is supplied to the first electrode of the light-emitting element LD, the parasitic capacitor of the light-emitting element LD, which is charged with a residual voltage, is discharged (e.g., the residual voltage is removed), and unintended slight emission of light may be prevented.

In an embodiment, the voltage level of the second initialization power Vint2 may be different in the active period ACTP and the blank period BLKP of a single frame period FP. Here, the voltage level of the second initialization power Vint2 may gradually change in response to the transition between the same types of periods or between different types of periods among the active period ACTP and the blank periods BLKP. For example, regarding the transition from the active period ACTP to the blank period BLKP, the blank period BLKP may include a dimming period, which starts from the start point of the blank period BLKP and ends at a preset point and in which the voltage level of the second initialization power Vint2 gradually decreases. Accordingly, display quality degradation arising from the residual voltage in the parasitic capacitor of the light-emitting element LD may be improved.

In FIG. 5, the first scan signal GBi is illustrated as being supplied in each of the non-emission periods NEP1 and NEP2, but embodiments are not limited thereto. The first scan signal GBi may be supplied only in part of the second non-emission periods NEP2. For example, the first scan signal GBi may be supplied to the first scan line S1*i* only in the active period ACTP and the second blank period BLKP of FIG. 5.

The periods in which the emission control signal EMi has a logic low level may be the emission periods EP, EP1, and EP2, and the period, other than the emission periods EP, EP1 and EP2, may be the non-emission periods NEP, NEP1, and NEP2.

The gate-on voltages of the second scan signal GCi and the third scan signal GIi respectively supplied to the third transistor M3 and the seventh transistor M7, which are N-type transistors, have a logic high level. The gate-on voltage of the fourth scan signal GWi supplied to the second transistor M2, which is a P-type transistor, and the gate-on voltage of the first scan signal GBi supplied to the fourth transistor M4 and the eighth transistor M8, which are P-type transistors, have a logic low level.

As illustrated in FIG. 5, the first scan signal GBi may be supplied to the first scan line S1*i* in the second non-emission period NEP2, which is the non-emission period of the blank period BLKP. Accordingly, the voltage of the on-bias power Vobs may be supplied to the first electrode of the first transistor M1 in the second non-emission period NEP2. For example, an on-bias may be periodically applied to the first transistor M1, regardless of the frame frequency. Also, to maintain a stable on-bias state, the first scan signal GBi may be supplied to the first scan line S1*i* a plurality of times in the second non-emission period NEP2. Accordingly, a luminance change of the display device due to the first transistor M1 in the frame period FP of a low-frequency driving state may be minimized or at least reduced. The first scan signal GBi may be supplied to the first scan line Si1 a plurality of times even in the active period ACTP to drive the scan driver 200 and to simplify the configuration of the display device 1000.

Hereinafter, the scan signals GBi, GCi, GIi, and GWi supplied in the active period ACTP and the operation of the pixel PX1 will be described in more detail with reference to FIGS. 3 and 4.

For a non-emission period NEP, an emission control signal EMi may be supplied to the emission control line Ei. Accordingly, the fifth transistor M5 and the sixth transistor M6 may be turned off for the non-emission period NEP. The non-emission period NEP may include first to fifth periods P1 to P5.

In the first period P1, the scan driver 200 may supply a second scan signal GCi to the second scan line S2*i*, and may supply a first scan signal GBi to the first scan line S1*i*. In an embodiment, the first scan signal GBi may be supplied after the second scan signal GCi is supplied. Accordingly, in the first period P1, the fourth transistor M4 may be turned on after the third transistor M3 is turned on.

When only the fourth transistor M4 is turned on without the supply of the second scan signal GCi, the voltage of the on-bias power Vobs may be supplied to the first node N1 (and, thereby, the source electrode of the first transistor M1). Here, the high voltage of the on-bias power Vobs is applied to the first node N1, whereby the first transistor M1 may have an on-bias state. For example, when the voltage of the on-bias power Vobs is equal to or higher than about 5 V, the first transistor M1 has a source voltage and a drain voltage equal to or higher than about 5 V, and the absolute value of the gate-source voltage of the first transistor M1 may increase.

In this state, when a data signal is supplied by the supply of a fourth scan signal GWi, the driving current is unintentionally changed by the effect of the bias state of the first transistor M1, and the image luminance may fluctuate (e.g., the luminance is increased).

To solve this problem, the scan driver 200 may supply the second scan signal GCi before the supply of the first scan signal GBi in the first period P1. Accordingly, the third transistor M3 may be turned on before the fourth transistor M4 is turned on. The third transistor M3 is turned on, whereby the second node N2 and the third node N3 may conduct electricity with each other. After that, when the fourth transistor M4 is turned on, the voltage of the on-bias power Vobs may be delivered to the third node N3 via the first node N1. For example, the voltage difference between the first node N1 and the third node N3 may decrease to the level of the threshold voltage of the first transistor M1. Accordingly, the magnitude of the gate-source voltage of the first transistor M1 may become very low in the first period P1. For example, the first transistor M1 may be set to an off-bias state.

As described above, to prevent an unintended increase in the luminance, which is caused by the supply of the voltage of the on-bias power Vobs before writing of a data signal, in the first period P1, the supply of the first scan signal GBi and the supply of the second scan signal GCi may be controlled such that the fourth transistor M4 is turned on in the state in which the third transistor M3 is turned on.

In an embodiment, the width W1 of the second scan signal GCi may be greater than the width W2 of the first scan signal GBi in the first period P1. For example, in the first period P1, the third transistor M3 may be turned on before the fourth transistor M4 is turned on, and may be turned off after the fourth transistor M4 is turned off.

However, this is merely an example, and the third transistor M3 may be turned off before the fourth transistor M4 is turned off.

In response to the first scan signal GBi, the eighth transistor M8 may be turned on, and the voltage of the second initialization power Vint2 may be supplied to the first electrode of the light-emitting element LD (or the fourth node N4).

Subsequently, the scan driver 200 may supply a third scan signal GIi to the third scan line S3*i* in the second period P2. The seventh transistor M7 may be turned on in response to the third scan signal GIi. When the seventh transistor M7 is turned on, the voltage of the first initialization power Vint1 may be supplied to the gate electrode of the first transistor M1. For instance, in the second period P2, the gate voltage of the first transistor M1 may be initialized based on the voltage of the first initialization power Vint1. Accordingly, a strong on-bias is applied to the first transistor M1, and the hysteresis characteristic may be changed (the threshold voltage thereof is shifted).

Subsequently, the scan driver 200 may supply the second scan signal GCi to the second scan line S2*i* in the third period P3. In response to the second scan signal GCi, the third transistor M3 may be turned on again. In the third period P3, the scan driver 200 may supply the fourth scan signal GWi to the fourth scan line S4*i* so as to overlap a part of the second scan signal GCi. The second transistor M2 may be turned on in response to the fourth scan signal GWi, and a data signal may be provided to the first node N1.

Here, by the third transistor M3 that is turned on, the first transistor M1 is coupled in a diode form, and writing of a data signal and compensation for the threshold voltage may be performed. Because the supply of the second scan signal GCi is maintained even after the supply of the fourth scan signal GWi is stopped, the threshold voltage of the first transistor M1 may be compensated for during a sufficient time.

Subsequently, the scan driver 200 may supply the first scan signal GBi to the first scan line S1*i* again in the fourth period P4. Accordingly, the fourth transistor M4 and the eighth transistor M8 may be turned on. The fourth transistor M4 is turned on, whereby the voltage of the on-bias power Vobs may be supplied to the first node N1.

The effect of the strong on-bias applied in the second period P2 may be removed by the operation of writing a data signal and the operation of compensating for the threshold voltage. For example, the compensation for the threshold voltage in the third period P3 may cause the voltage difference between the gate voltage and the source voltage (and drain voltage) of the first transistor M1 to be significantly decreased. As a result, the characteristic of the first transistor M1 changes again, and the driving current in the emission period EP may increase or the floating of a black grayscale may appear.

To prevent this characteristic change, the fourth transistor M4 may be turned on in the fourth period P4. Accordingly, the voltage of the on-bias power Vobs is supplied to the source electrode of the first transistor M1 in the fourth period P4, whereby the first transistor M1 may be set to an on-bias state.

To set the first transistor M1 to a stable on-bias state based on the operation in the fourth period P4 before emission, a sufficient spare time is used between the fourth period P4 and the emission period EP. Therefore, a fifth period P5 in which none of the scan signals GBi, GCi, GIi, and GWi is supplied may be inserted between the fourth period P4 and the emission period EP.

In an embodiment, the length of the fifth period P5 may be equal to or longer than four horizontal periods. For example, the length of the fifth period P5 may be equal to or longer than about 10 μs. Accordingly, the first transistor M1 may have a stable on-bias state before the emission period EP. Accordingly, even though the frame period FP like what is illustrated in FIG. 5 is repeated, the emission luminance may be stably maintained.

In an embodiment, the first to fourth scan signals GBi, GCi, GIi, and GWi may be supplied from the first to fourth scan drivers 220, 240, 260 and 280 of FIG. 2, respectively.

Figure 6A:
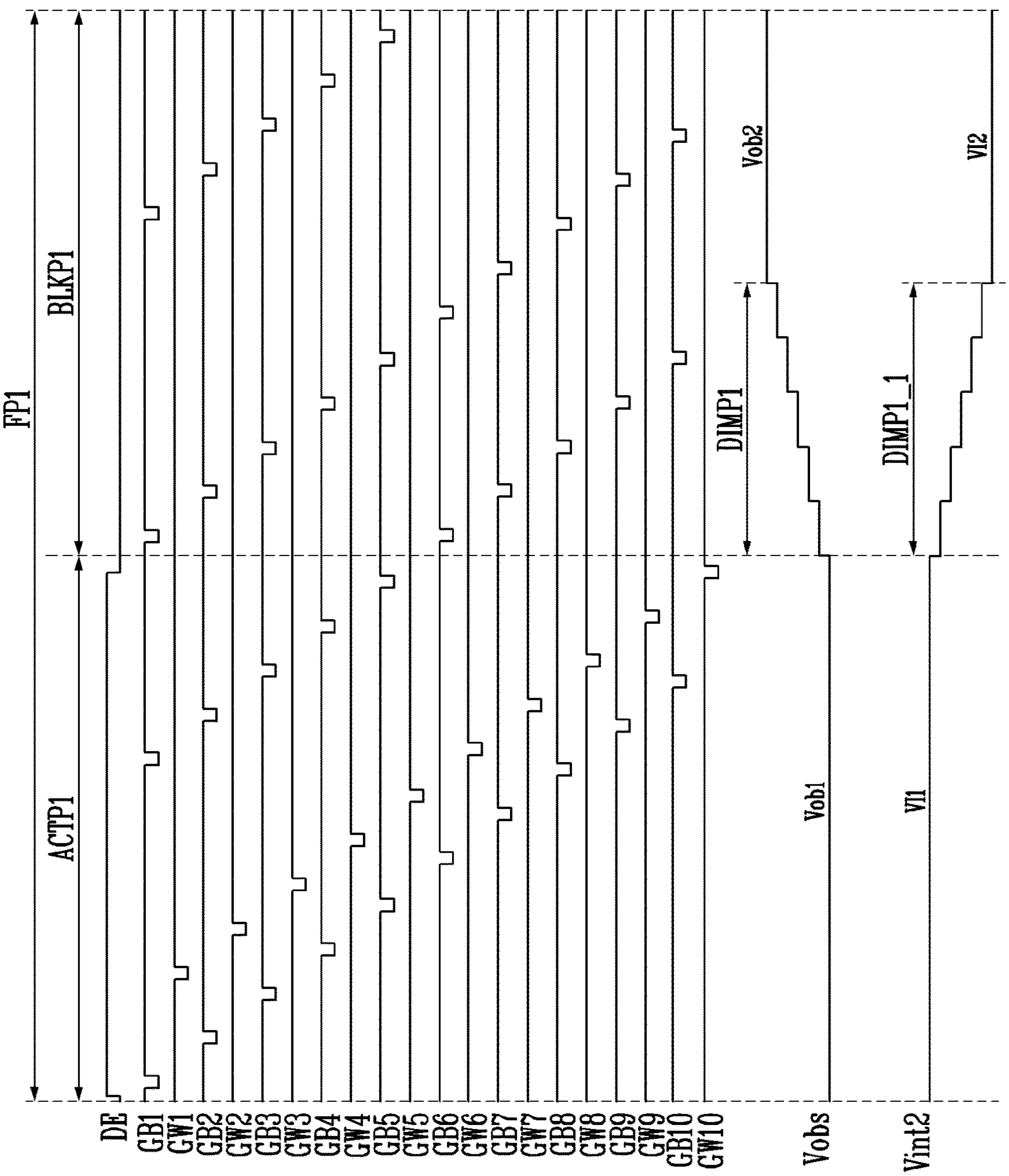
FIG. 6A is a timing diagram illustrating an example of an on-bias power voltage and a second initialization power voltage supplied to the pixel of FIG. 3 according to an embodiment.
Figure 6B:
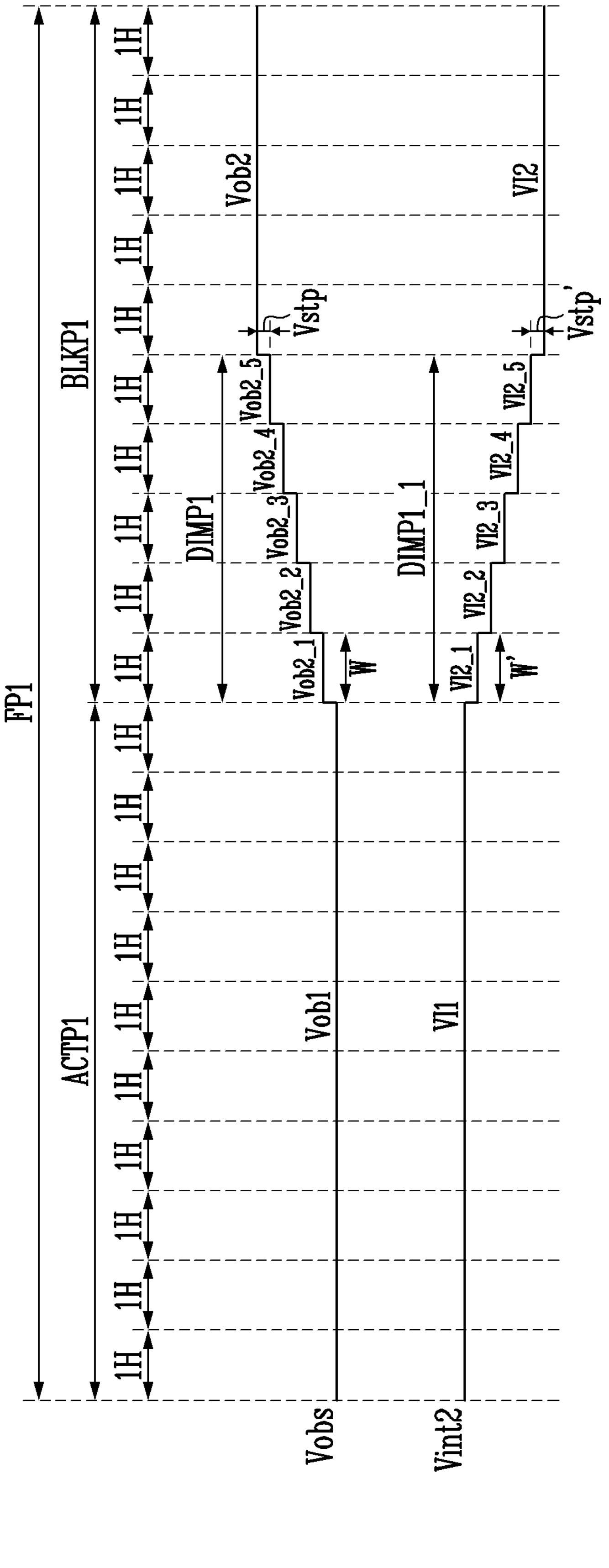
FIG. 6B is a timing diagram for explaining the on-bias power voltage and the second initialization power voltage of FIG. 6A according to an embodiment.
Figure 6C:
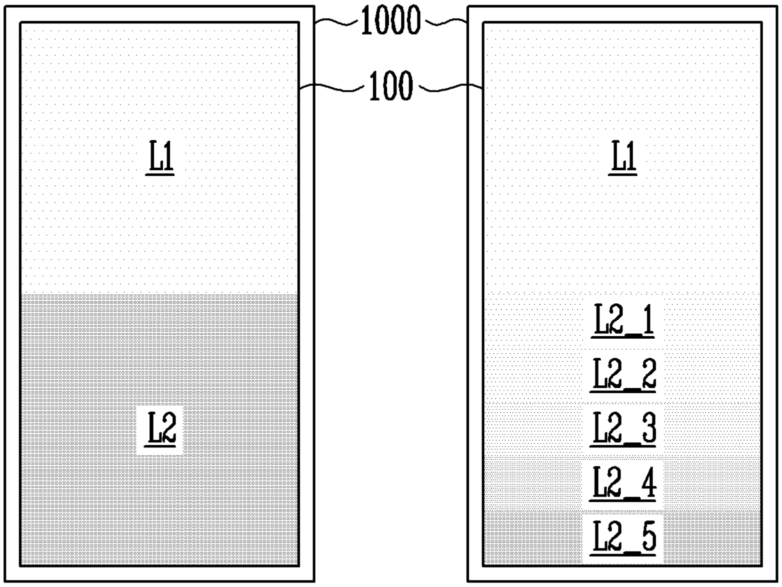
FIGS. 6Ca and 6Cb are views illustrating a change in the luminance of a display device to explain the effect of inclusion of a dimming period for on-bias power and second initialization power according to some embodiments.

FIG. 6A is a timing diagram illustrating an example of an on-bias power voltage and a second initialization power voltage supplied to the pixel of FIG. 3 according to an embodiment. FIG. 6B is a timing diagram for explaining the on-bias power voltage and the second initialization power voltage of FIG. 6A according to an embodiment. FIGS. 6Ca and 6Cb are views illustrating a change in the luminance of a display device to explain the effect of inclusion of a dimming period for on-bias power and second initialization power according to some embodiments. Here, the display device 1000 is assumed to have ten pixel rows for convenience of description; however, the number of pixel rows in the display device 1000 is not limited thereto. For example, when the resolution of the display device 1000 is Full High Definition (FHD), the number of pixel rows may be 1080, and when the resolution thereof is Ultra High Definition (UHD), the number of pixel rows may be 2160.

Referring to FIGS. 1, 4, and 6A, a first frame period FP1 according to an embodiment may include a first active period ACTP1, in which a data signal is supplied to the display panel 100, and a first blank period BLKP1, in which no data signal is supplied to the display panel 100.

For instance, for the first active period ACTP1 in which a data enable signal DE is supplied, the scan driver 200 may supply a first scan signal GBi through the first scan line S1*i* and supply a fourth scan signal GWi through the fourth scan line S4*i*. For example, the scan driver 200 may sequentially supply the first scan signals GB1 to GB10 to the respective pixel rows twice for the first active period ACTP1, and may sequentially supply the fourth scan signals GW1 to GW10 to the respective pixel rows once for the first active period ACTP1. Here, the timing of the first supply of the first scan signals GB1 to GB10, which are provided twice in the first active period ACTP1, does not overlap the following first blank period BLKP1, but the timing of the second supply thereof may partially overlap the first blank period BLKP1. As such, the timing of the second supply of the first scan signals GB6 to GB10, which are supplied to the sixth to tenth pixel rows, among the first scan signals GB1 to GB10, may overlap the first blank period BLKP1.

For the first blank period BLKP1, in which a data enable signal DE is not provided, the scan driver 200 may supply the first scan signal GBi through the first scan line S1*i*, but may not supply the fourth scan signal GWi. For example, the scan driver 200 may sequentially supply the first scan signals GB1 to GB10 to the respective pixel rows twice for the first blank period BLKP1, but may not supply the fourth scan signals GW1 to GW10 for the first blank period BLKP1.

The power supply 500 may provide the on-bias power Vobs having a first voltage level Vob1 in the first active period ACTP1, and may provide the on-bias power Vobs having a second voltage level Vob2, which is different from the first voltage level Vob1, in the first blank period BLKP1. Here, the first blank period BLKP1 following the first active period ACTP1 may include a first dimming period DIMP1 in which the on-bias power Vobs gradually changes, e.g., a stepwise or other gradual change, from the first voltage level Vob1 to the second voltage level Vob2.

Also, the power supply 500 may provide the second initialization power Vint2 having a third voltage level VI1 in the first active period ACTP1, and may provide the second initialization power Vint2 having a fourth voltage level VI2, which is different from the third voltage level VI1, in the first blank period BLKP1. The first blank period BLKP1 following the first active period ACTP1 may include a 1_1-th dimming period DIMP1_1 in which the second initialization power Vint2 gradually changes, e.g., a stepwise or other gradual change, from the third voltage level VI1 to the fourth voltage level VI2.

Referring to FIGS. 3 and 6B, the second voltage level Vob2 of the on-bias power Vobs according to an embodiment may be higher than the first voltage level Vob1 thereof.

Also, the fourth voltage level VI2 of the second initialization power Vint2 may be lower than the third voltage level VI1 thereof.

In some embodiments, the lower the driving frequency, the longer the length of a single frame period (e.g., FP1). In other words, the number of blank periods (e.g., BLKP1) included in a single frame (e.g., FP1) may increase. In this case, due to the effect of the bias state of the first transistor M1, the extent of unintended change of a driving current may increase. As a result, the luminance of a displayed image may fluctuate (e.g., the luminance increases). In this case, as illustrated in FIG. 6B, the on-bias power Vobs having a voltage level (e.g., the second voltage level Vob2) higher than that in the first active period ACTP1 is supplied to the pixel PX1 in the first blank period BLKP1, whereby the fluctuation of the image luminance in the blank period (e.g., BLKP1) may be effectively prevented.

Also, the second initialization power Vint2 having a voltage level (e.g., the fourth voltage level VI2) lower than that in the first active period ACTP1 is supplied to the light-emitting element LD included in the pixel PX1 in the first blank period BLKP1, whereby the initialization amount for the parasitic capacitor of the light-emitting element LD may increase in response to the voltage level of the second initialization power Vint2 applied to the light-emitting element LD decreasing. Accordingly, an increase in the image luminance is controlled, and the luminance of the displayed image decreases, whereby the fluctuation of the image luminance may be improved.

However, when the voltage of the on-bias power Vobs and/or the voltage of the second initialization power Vint2 rapidly change(s) without a diming period (e.g., DIMP1 or DIMP1_1) at the time of transition from the first active period ACTP1 to the first blank period BLKP1, the luminance difference (or Half Mura) may be visibly recognized in the middle of the pixel rows included in the display panel 100 (e.g., the sixth pixel row, among the ten pixel rows), as illustrated in FIG. 6Ca. This is because the timing of the second supply of the first scan signals GB1 to GB10, which are supplied twice in the first active period ACTP1, partially overlaps the first blank period BLKP1, as described above with reference to FIG. 6A.

For example, because all of the timings of the first supply and the second supply of the first scan signals (e.g., GB1 to GB5) to the first to fifth pixel rows, among the ten pixel rows, correspond to the first active period ACTP1, the on-bias power Vobs having the first voltage level Vob1 and the second initialization power Vint2 having the third voltage level VI1 may be uniformly supplied. Accordingly, the display panel 100 may be displayed with first luminance L1.

On the other hand, because the timing of the first supply of the first scan signals (e.g., GB6 to GB10) to the sixth to tenth pixel rows, among the ten pixel rows, corresponds to the first active period ACTP1, the on-bias power Vobs having the first voltage level Vob1 and the second initialization power Vint2 having the third voltage level VI1 are supplied; however, because the timing of the second supply of the first scan signals (e.g., GB6 to GB10) corresponds to the first blank period BLKP1, the on-bias power Vobs having the second voltage level Vob2 and the second initialization power Vint2 having the fourth voltage level VI2 may be supplied. Accordingly, the display panel 100 may be displayed with second luminance L2, which is darker than the first luminance L1. Accordingly, the luminance difference (or Half Mura) may be visibly recognized in the middle of the pixel rows included in the display panel 100 (e.g., the sixth pixel row, among the ten pixel rows).

To decrease this luminance difference, the display device 1000 according to an embodiment may include dimming periods DIMP1 and DIMP1_1 in which the voltage of the on-bias power Vobs and the voltage of the second initialization power Vint2 gradually changes when (or as) the first active period ACTP1 is transitioned to the first blank period BLKP1.

As illustrated in FIG. 6B, the voltage level of the on-bias power Vobs may gradually increase from the first voltage level Vob1 to the second voltage level Vob2 for the first dimming period DIMP1. For example, the on-bias power Vobs may include a 2_1-th voltage level Vob2_1, a 2_2-th voltage level Vob2_2, a 2_3-th voltage level Vob2_3, a 2_4-th voltage level Vob2_4, and a 2_5-th voltage level Vob2_5 for the first dimming period DIMP1. Here, the 2_1-th voltage level Vob2_1, the 2_2-th voltage level Vob2_2, the 2_3-th voltage level Vob2_3, the 2_4-th voltage level Vob2_4, and the 2_5-th voltage level Vob2_5 may be increasing voltage levels in the order in which they are listed.

The first dimming period DIMP1 according to an embodiment may correspond to half the first blank period BLKP1, and the voltage level of the on-bias power Vobs may increase based on a preset voltage width W and a preset voltage magnitude Vstp. For example, the voltage width W may be set by taking one horizontal period 1H as the basic unit (e.g., 1H, 2H, 3H, and the like), and the voltage magnitude Vstp may be set based on the following Equation (1):

$$Vstp = (Vob2 - Vob1)/(\mathrm{L\_BLKP}/(2*W)+1) \qquad \text{Eq. (1)}$$

where Vstp denotes the voltage magnitude, Vob1 denotes the first voltage level, Vobs2 denotes the second voltage level, L_BLKP denotes the length of a blank period, and W denotes the voltage width.

Also, the voltage level of the second initialization power Vint2 may gradually decrease from the third voltage level VI1 to the fourth voltage level VI2 for the 1_1-th dimming period DIMP1_1. For example, the second initialization power Vint2 may include a 4_1-th voltage level VI2_1, a 4_2-th voltage level VI2_2, a 4_3-th voltage level VI2_3, a 4_4-th voltage level VI2_4, and a 4_5-th voltage level VI2_5 for the 1_1-th dimming period DIMP1_1. Here, the 4_1-th voltage level VI2_1, the 4_2-th voltage level VI2_2, the 4_3-th voltage level VI2_3, the 4_4-th voltage level VI2_4, and the 4_5-th voltage level VI2_5 may be decreasing voltage levels in the order in which they are listed.

The 1_1-th dimming period DIMP1_1 according to an embodiment may correspond to half the first blank period BLKP1, and the voltage level of the second initialization power Vint2 may decrease based on a preset voltage width W' and a preset voltage magnitude Vstp'. For example, the voltage width W' may be set by taking one horizontal period 1H as the basic unit (e.g., 1H, 2H, 3H, and the like), and the voltage magnitude Vstp' may be set based on the following Equation (2):

$$Vstp' = (VI1 - VI2)/(\mathrm{L\_BLKP}/(2*W')+1) \qquad \text{Eq. (2)}$$

where Vstp' denotes the voltage magnitude, VI1 denotes the third voltage level, VI2 denotes the fourth voltage level, L_BLKP denotes the length of a blank period, and W' denotes the voltage width.

Accordingly, the luminance difference (or Half Mura) is gradually changed in the middle of the pixel rows included in the display panel 100 (e.g., the sixth pixel row, among the ten pixel rows), as illustrated in FIG. 6Cb, whereby the luminance difference may be prevented from being visibly recognized.

For example, because all of the timings of the first supply and the second supply of the first scan signals (e.g., GB1 to GB5) to the first to fifth pixel rows, among the ten pixel rows, correspond to the first active period ACTP1, the on-bias power Vobs having the first voltage level Vob1 and the second initialization power Vint2 having the third voltage level VI1 may be supplied. Accordingly, the display panel 100 may be displayed with the first luminance L1.

Further, because the timing of the first supply of the first scan signals (e.g., GB6 to GB10) to the sixth to tenth pixel rows, among the ten pixel rows, corresponds to the first active period ACTP1, the on-bias power Vobs having the first voltage level Vob1 and the second initialization power Vint2 having the third voltage level VI1 are supplied. It is noted, however, that the timing of the second supply of the first scan signals (e.g., GB6 to GB10) corresponds to the dimming periods DIMP1 or DIMP1_1. Accordingly, in the case of the sixth pixel row, the on-bias power Vobs having the 2_1-th voltage level Vob2_1 and the second initialization power Vint2 having the 4_1-th voltage level VI2_1 are supplied thereto, the display panel 100 may be displayed with the 2_1-th luminance L2_1, which is darker than the first luminance L1, in the sixth pixel row. In the case of the seventh pixel row, the on-bias power Vobs having the 2_2-th voltage level Vob2_2 and the second initialization power Vint2 having the 4_2-th voltage level VI2_2 are supplied thereto, the display panel 100 may be displayed with the 2_2-th luminance L2_2, which is darker than the 2_1-th luminance L2_1, in the seventh pixel row. In the case of the eighth pixel row, the on-bias power Vobs having the 2_3-th voltage level Vob2_3 and the second initialization power Vint2 having the 4_3-th voltage level VI2_3 are supplied thereto, the display panel 100 may be displayed with the 2_3-th luminance L2_3, which is darker than the 2_2-th luminance L2_2, in the eighth pixel row. In the case of the ninth pixel row, the on-bias power Vobs having the 2_4-th voltage level Vob2_4 and the second initialization power Vint2 having the 4_4-th voltage level VI2_4 are supplied thereto, the display panel 100 may be displayed with the 2_4-th luminance L2_4, which is darker than the 2_3-th luminance L2_3, in the ninth pixel row. In the case of the tenth pixel row, the on-bias power Vobs having the 2_5-th voltage level Vob2_5 and the second initialization power Vint2 having the 4_5-th voltage level VI2_5 are supplied thereto, the display panel 100 may be displayed with the 2_5-th luminance L2_5, which is darker than the 2_4-th luminance L2_4, in the tenth pixel row.

As described above, from the middle of the pixel rows included in the display panel 100 (e.g., from the sixth pixel row, among the ten pixel rows), the luminance is gradually changed (e.g., decreased) from the 2_1-th luminance L2_1 to the 2_5-th luminance L2_5, whereby the luminance difference (or Half Mura) may be prevented from being visibly recognized. In FIG. 6Cb, the display panel 100 is illustrated on the assumption that the display panel 100 includes ten pixel rows for convenience of description, but the display panel 100 may include more pixel rows as the resolution of the display device 1000 is higher, as described above. Also, in response thereto, the voltage of the on-bias power Vobs and the voltage of the second initialization power Vint2 included in the dimming periods DIMP1 and DIMP1_1 are divided into levels with a smaller level difference, but the luminance difference between the pixel rows may be decreased more.

Figure 7A:
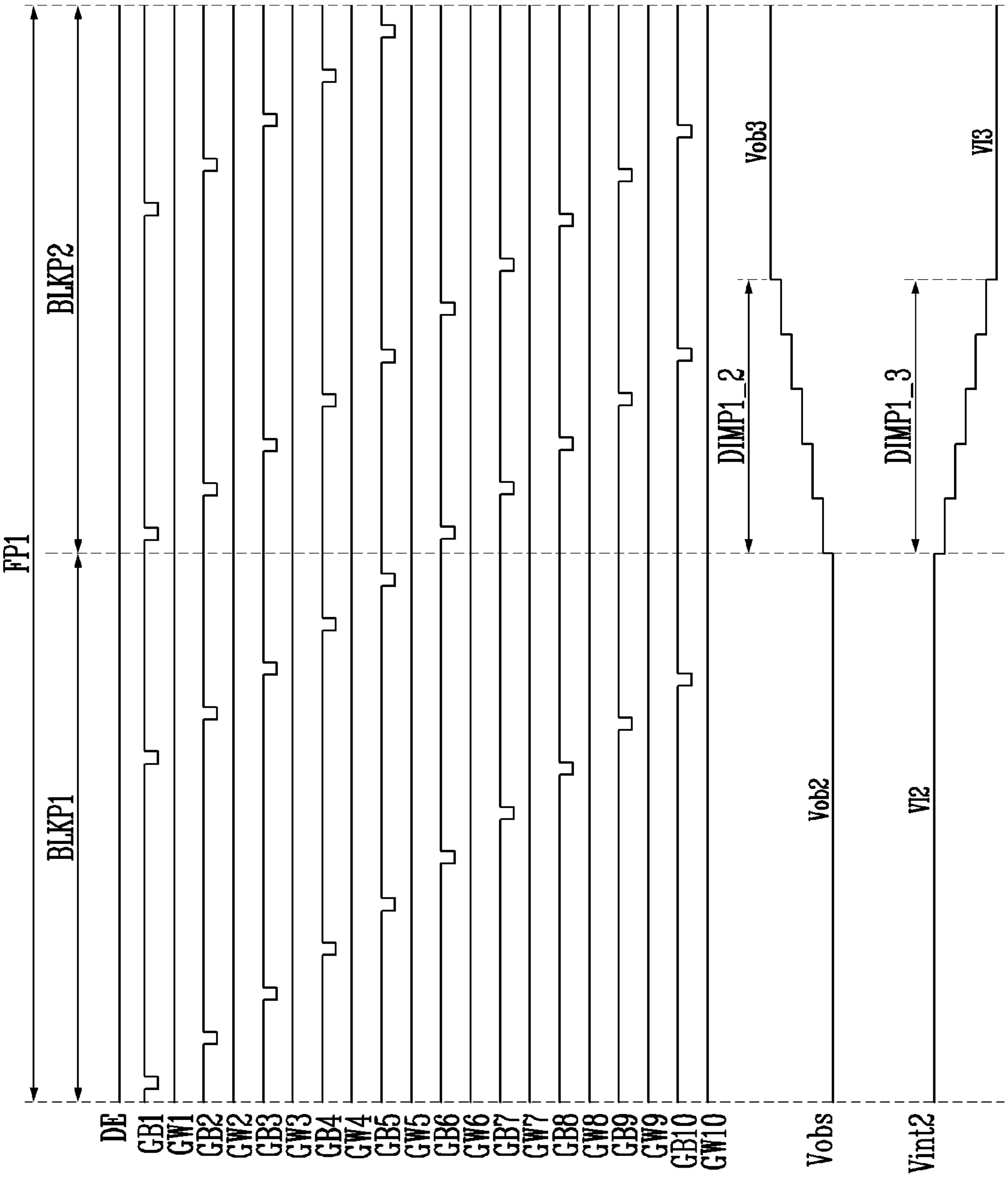
FIG. 7A is a timing diagram illustrating an example of an on-bias power voltage and a second initialization power voltage supplied to the pixel of FIG. 3 according to an embodiment.
Figure 7B:
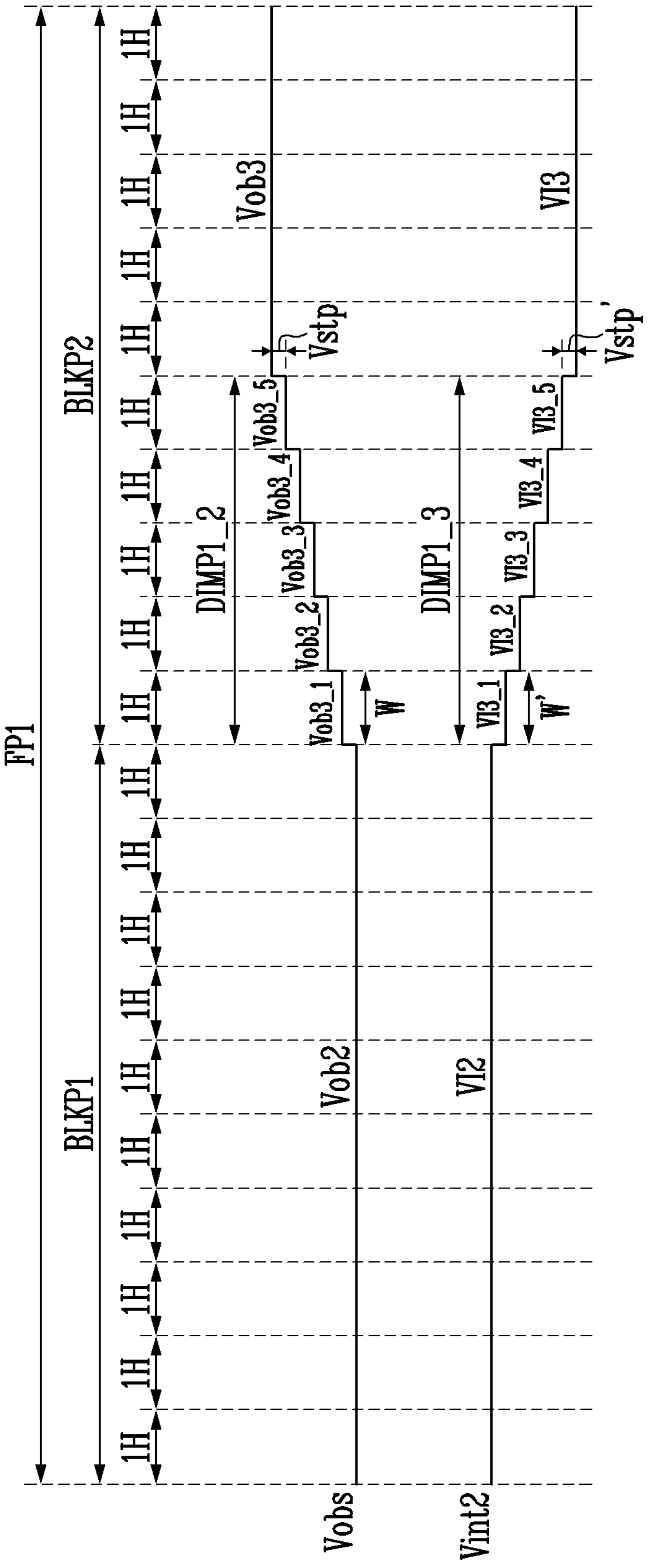
FIG. 7B is a timing diagram for explaining the on-bias power voltage and the second initialization power voltage of FIG. 7A according to an embodiment.

FIG. 7A is a timing diagram illustrating an example of an on-bias power voltage and a second initialization power voltage supplied to the pixel of FIG. 3 according to an embodiment. FIG. 7B is a timing diagram for explaining the on-bias power voltage and the second initialization power voltage of FIG. 7A according to an embodiment. Here, the display device 1000 is assumed to have ten pixel rows for convenience of description. However, the number of pixel rows in the display device 1000 is not limited thereto. For example, when the resolution of the display device 1000 is Full High Definition (FHD), the number of pixel rows may be 1080, and when the resolution thereof is Ultra High Definition (UHD), the number of pixel rows may be 2160.

Embodiments described in association with FIGS. 7A and 7B pertain to a change in the voltage of on-bias power Vobs and a change in the voltage of second initialization power Vint2 at the time of transition from a first blank period BLKP1 to a second blank period BLKP2 in the first frame period FP1, when compared with the embodiments described in association with FIGS. 6A and 6B, which pertain to a change in the voltage of the on-bias power Vobs and a change in the voltage of the second initialization power Vint2 at the time of transition from the first active period ACTP1 to the first blank period BLKP1 in the first frame period FP1.

Referring to FIGS. 1, 4, 6A, and 7A, the first frame period FP1 according to an embodiment includes a first active period ACTP1, in which a data signal is supplied to the display panel 100, and a first blank period BLKP1, in which no data signal is supplied to the display panel 100, and may further include a second blank period BLKP2 following the first blank period BLKP1.

Even in the blank periods BLKP1 and BLKP2, the extent of change of a driving current may increase as the frame period FP1 (or the display period) becomes longer. For instance, the extent of change of the driving current may increase in the second blank period BLKP2, compared to the first blank period BLKP1. To prevent this effect, the voltage of the on-bias power Vobs may have a first voltage level Vob1 in the active period ACTP1, may have a second voltage level Vob2, which is higher than the first voltage level Vob1, in the first blank period BLKP1, and may have a fifth voltage level Vob3, which is higher than the second voltage level Vob2, in the second blank period BLKP2. Also, the second initialization power Vint2 may have a third voltage level VI1 in the active period ACTP1, may have a fourth voltage level VI2, which is lower than the third voltage level VI1, in the first blank period BLKP1, and may have a sixth voltage level VI3, which is lower than the fourth voltage level VI2, in the second blank period BLKP2.

For instance, for the first and second blank periods BLKP1 and BLKP2, the scan driver 200 may supply a first scan signal GBi through the first scan line S1*i*, and may not supply a fourth scan signal GWi. For example, the scan driver 200 may sequentially supply the first scan signals GB1 to GB10 to the respective pixel rows twice for the first blank period BLKP1. Here, the timing of the first supply of the first scan signals GB1 to GB10, which are provided twice in the first blank period BLKP1, does not overlap the following second blank period BLKP2, but the timing of the second supply thereof may partially overlap the second blank period BLKP2. For example, the timing of the second supply of the first scan signals GB6 to GB10, which are supplied to the sixth to tenth pixel rows, among the first scan signals GB1 to GB10, may overlap the second blank period BLKP2.

The power supply 500 may provide the on-bias power Vobs having the second voltage level Vob2 in the first blank period BLKP1, and may provide the on-bias power Vobs having the fifth voltage level Vob3, which is different from the second voltage level Vob2, in the second blank period BLKP2. Here, the second blank period BLKP2 following the first blank period BLKP1 may include a 1_2-th dimming period DIMP1_2 in which the on-bias power Vobs gradually changes from the second voltage level Vob2 to the fifth voltage level Vob3.

Also, the power supply 500 may provide the second initialization power having the fourth voltage level VI2 in the first blank period BLKP1, and may provide the second initialization power Vint2 having the sixth voltage level VI3, which is different from the fourth voltage level VI2, in the second blank period BLKP2. The second blank period BLKP2 following the first blank period BLKP1 may include a 1_3-th dimming period DIMP1_3 in which the second initialization power Vint2 gradually changes from the fourth voltage level VI2 to the sixth voltage level VI3.

Referring to FIGS. 3 and 7B, the fifth voltage level Vob3 of the on-bias power Vobs according to an embodiment may be higher than the second voltage level Vob2 thereof. Also, the sixth voltage level VI3 of the second initialization power Vint2 may be lower than the fourth voltage level VI2 thereof.

The on-bias power Vobs having a voltage level (e.g., the fifth voltage level Vob3) higher than that in the first blank period BLKP1 is supplied to the pixel PX1 in the second blank period BLKP2, whereby the fluctuation of the image luminance in the second blank period BLKP2 may be effectively prevented. Also, the second initialization power Vint2 having a voltage level (e.g., the sixth voltage level VI3) lower than that in the first blank period BLKP1 is supplied to the light-emitting element LD included in the pixel PX1 in the second blank period BLKP2, whereby the initialization amount for the parasitic capacitor of the light-emitting element LD may increase when (or as) the voltage level of the second initialization power Vint2 applied to the light-emitting element LD decreases. Accordingly, an increase in the image luminance is controlled, and the luminance of the displayed image decreases, whereby the fluctuation of the image luminance may be improved.

However, when the voltage of the on-bias power Vobs and/or the voltage of the second initialization power Vint2 rapidly change(s) without a dimming period (e.g., DIMP1_2 or DIMP1_3) at the time of transition from the first blank period BLKP1 to the second blank period BLKP2, the luminance difference (or Half Mura) may be visibly recognized in the middle of the pixel rows included in the display panel 100 (e.g., the sixth pixel row, among the ten pixel rows), similar to what is illustrated in FIG. 6Ca.

This is because the timing of the first supply of the first scan signals GB1 to GB10, which are provided twice in the first blank period BLKP1, does not overlap the second blank period BLKP2, but the timing of the second supply thereof partially overlaps the second blank period BLKP2, as described above with reference to FIG. 7A.

To decrease this luminance difference, the display device 1000 according to an embodiment may include dimming periods DIMP1_2 and DIMP1_3 in which the voltage of the on-bias power Vobs and the voltage of the second initialization power Vint2 gradually change when the first blank period BLKP1 is transitioned to the second blank period BLKP2.

As illustrated in FIG. 7B, the voltage level of the on-bias power Vobs may gradually increase from the second voltage level Vob2 to the fifth voltage level Vob3 for the 1_2-th dimming period DIMP1_2. For example, the on-bias power Vobs may include a 5_1-th voltage level Vob3_1, a 5_2-th voltage level Vob3_2, a 5_3-th voltage level Vob3_3, a 5_4-th voltage level Vob3_4, and a 5_5-th voltage level Vob3_5 for the 1_2-th dimming period DIMP1_2. Here, the 5_1-th voltage level Vob3_1, the 5_2-th voltage level Vob3_2, the 5_3-th voltage level Vob3_3, the 5_4-th voltage level Vob3_4, and the 5_5-th voltage level Vob3_5 may be increasing voltage levels in the order in which they are listed.

The 1_2-th dimming period DIMP1_2 according to an embodiment may correspond to half the second blank period BLKP2, and the voltage level of the on-bias power Vobs may increase based on a preset voltage width W and a preset voltage magnitude Vstp. For example, the voltage width W may be set by taking one horizontal period 1H as the basic unit (e.g., 1H, 2H, 3H and the like), and the voltage magnitude Vstp may be set based on the following Equation (3):

$$Vstp = (Vob3 - Vob2)/(\mathrm{L\_BLKP}/(2 * W) + 1) \qquad \text{Eq. (3)}$$

where Vstp denotes the voltage magnitude, Vob2 denotes the second voltage level, Vob3 denotes the fifth voltage level, L_BLKP denotes the length of a blank period, and W denotes the voltage width.

Also, the voltage level of the second initialization power Vint2 may gradually decrease from the fourth voltage level VI2 to the sixth voltage level VI3 for the 1_3-th dimming period DIMP1_3. For example, the second initialization power Vint2 may include a 6_1-th voltage level VI3_1, a 6_2-th voltage level VI3_2, a 6_3-th voltage level VI3_3, a 6_4-th voltage level VI3_4, and a 6_5-th voltage level VI3_5 for the 1_3-th dimming period DIMP1_3. Here, the 6_1-th voltage level VI3_1, the 6_2-th voltage level VI3_2, the 6_3-th voltage level VI3_3, the 6_4-th voltage level VI3_4, and the 6_5-th voltage level VI3_5 may be decreasing voltage levels in the order in which they are listed.

The 1_3-th dimming period DIMP1_3 according to an embodiment may correspond to half the second blank period BLKP2, and the voltage level of the second initialization power Vint2 may decrease based on a preset voltage width W' and a preset voltage magnitude Vstp'. For example, the voltage width W' may be set by taking one horizontal period 1H as the basic unit (e.g., 1H, 2H, 3H and the like), and the voltage magnitude Vstp' may be set based on the following Equation (4):

$$Vstp' = (VI2 - VI3)/(\mathrm{L\_BLKP}/(2 * W') + 1) \qquad \text{Eq. (4)}$$

where Vstp' denotes the voltage magnitude, VI2 denotes the fourth voltage level, VI3 denotes the sixth voltage level, L_BLKP denotes the length of a blank period, and W' denotes the voltage width.

Accordingly, the luminance difference (or Half Mura) is gradually changed in the middle of the pixel rows included in the display panel 100 (e.g., the sixth pixel row, among the ten pixel rows), whereby the luminance difference may be prevented from being visibly recognized, similar to what is illustrated in FIG. 6Cb.

Figure 8A:
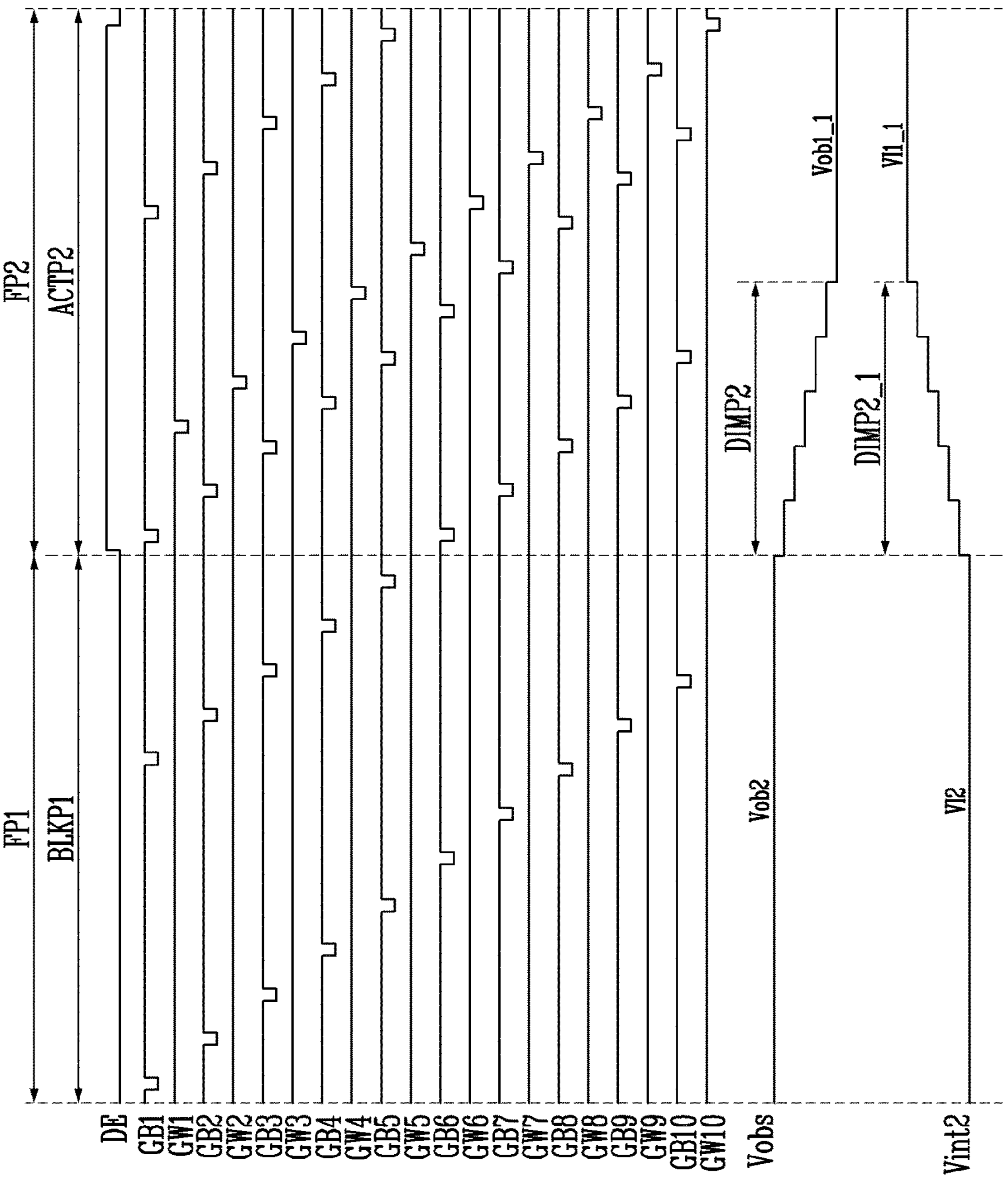
FIG. 8A is a timing diagram illustrating an example of an on-bias power voltage and a second initialization power voltage supplied to the pixel of FIG. 3 according to an embodiment.
Figure 8B:
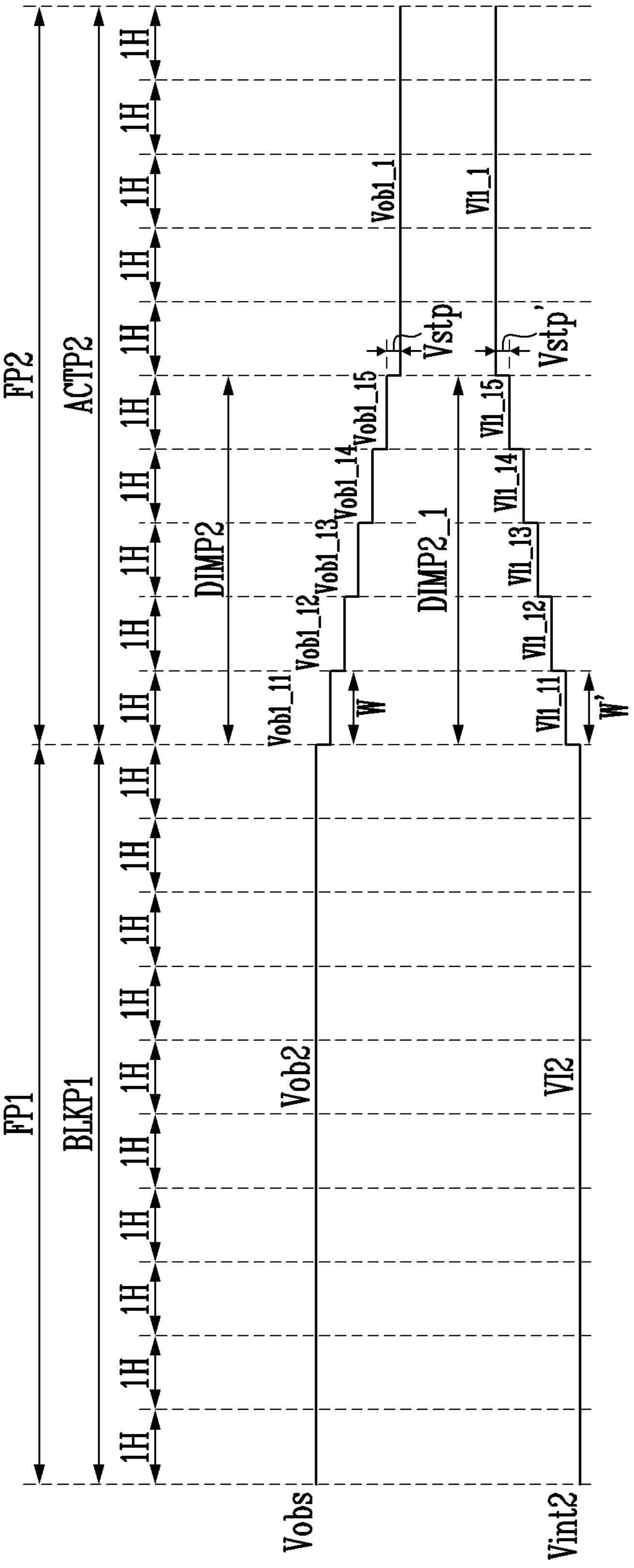
FIG. 8B is a timing diagram for explaining the on-bias power voltage and the second initialization power voltage of FIG. 8A according to an embodiment.
Figure 8C:
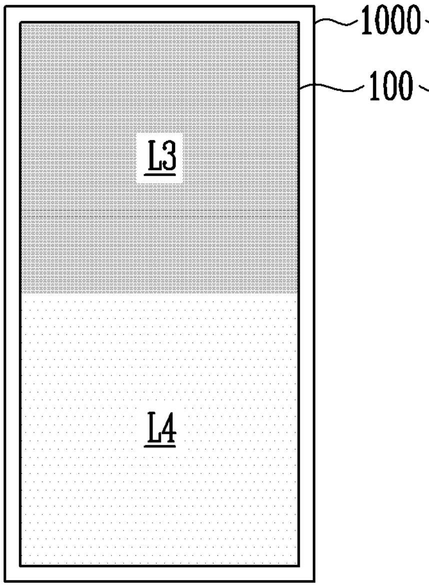
FIGS. 8Ca and 8Cb are views illustrating a change in the luminance of a display device to explain the effect of inclusion of a dimming period for on-bias power and second initialization power according to some embodiments.
Figure 8C:
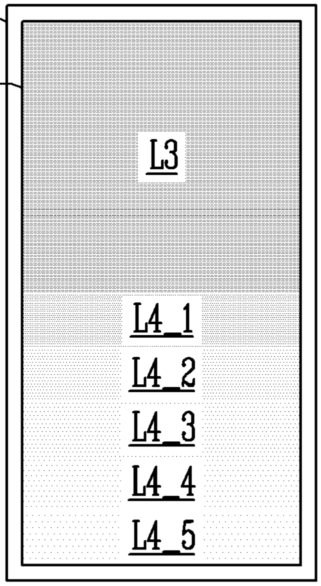

FIG. 8A is a timing diagram illustrating an example of an on-bias power voltage and a second initialization power voltage supplied to the pixel of FIG. 3 according to an embodiment. FIG. 8B is a timing diagram for explaining the on-bias power voltage and the second initialization power voltage of FIG. 8A according to an embodiment. FIGS. 8Ca and 8Cb are views illustrating a change in the luminance of a display device to explain the effect of inclusion of dimming periods for on-bias power and second initialization power according to some embodiments. Here, the display device 1000 is assumed to have ten pixel rows for convenience of description. However, the number of pixel rows in the display device 1000 is not limited thereto. For example, when the resolution of the display device 1000 is Full High Definition (FHD), the number of pixel rows may be 1080, and when the resolution thereof is Ultra High Definition (UHD), the number of pixel rows may be 2160.

Referring to FIGS. 1, 4, 6A, and 8A, various embodiments will be described pertaining to the transition from the first blank period BLKP1 of a first frame period FP1 to the second active period ACTP2 of a second frame period FP2, when compared with those embodiments described in association with FIGS. 6A, 6B, 6Ca, and 6Cb, which illustrate embodiments in which the first active period ACTP1 of the first frame period FP1 is transitioned to the first blank period BLKP1 thereof.

Each of the first and second frame periods FP1 and FP2 according to an embodiment may include an active period ACTP1 or ACTP2, in which a data signal is supplied to the display panel 100, and a first blank period BLKP1 in which no data signal is supplied to the display panel 100. In this case, the second active period ACTP2 of the second frame period FP2 may follow the first blank period BLKP1 of the first frame period FP1.

For instance, the scan driver 200 may supply a first scan signal GBi through the first scan line S1*i* for the first blank period BLKP1. For example, the scan driver 200 may sequentially supply the first scan signals GB1 to GB10 to the respective pixel rows twice for the first blank period BLKP1. Here, the timing of the first supply of the first scan signals GB1 to GB10, which are provided twice in the first blank period BLKP1, does not overlap the following second active period ACTP2, but the timing of the second supply thereof may partially overlap the second active period ACTP2. For instance, the timing of the second supply of the first scan signals GB6 to GB10, which are supplied to the sixth to tenth pixel rows, among the first scan signals GB1 to GB10, may overlap the second active period ACTP2.

In some embodiments, for the second active period ACTP2, in which a data enable signal DE is provided, the scan driver 200 may supply the first scan signal GBi through the first scan line S1*i*, and may supply a fourth scan signal GWi through the fourth scan line S4*i*. For example, the scan driver 200 may sequentially supply the first scan signals GB1 to GB10 to the respective pixel rows twice for the second active period ACTP2, and may supply the fourth scan signals GW1 to GW10 to the respective pixel rows once for the second active period ACTP2.

The power supply 500 may provide the on-bias power Vobs having a second voltage level Vob2 in the first blank period BLKP1, and may provide the on-bias power having a 1_1-th voltage level Vob1_1, which is different from the second voltage level Vob2, in the second active period ACTP2. Here, the second active period ACTP2 following the first blank period BLKP1 may include a second dimming period DIMP2 in which the on-bias power Vobs gradually changes from the second voltage level Vob2 to the 1_1-th voltage level Vob1_1.

Also, the power supply 500 may provide the second initialization power Vint2 having a fourth voltage level VI2 in the first blank period BLKP1, and may provide the second initialization power Vint2 having a 3_1-th voltage level VI1_1, which is different from the fourth voltage level VI2, in the second active period ACTP2. The second active period ACTP2 following the first blank period BLKP1 may include a 2_1-th dimming period DIMP2_1 in which the second initialization power Vint2 gradually changes from the fourth voltage level VI2 to the 3_1-th voltage level VI1_1.

Referring to FIGS. 3 and 8B, the 1_1-th voltage level Vob1_1 of the on-bias power Vobs according to an embodiment may be lower than the second voltage level Vob2 thereof. Also, the 3_1-th voltage level VI1_1 of the second initialization power Vint2 may be higher than the fourth voltage level VI2 thereof.

When the voltage of the on-bias power Vobs and/or the voltage of the second initialization power Vint2 rapidly change(s) without a diming period (e.g., DIMP2 or DIMP2_1) at the time of transition from the first blank period BLKP1 to the second active period ACTP2, the luminance difference (or Half Mura) may be visibly recognized in the middle of the pixel rows included in the display panel 100 (e.g., the sixth pixel row, among the ten pixel rows), as illustrated in FIG. 8Ca.

This is because the timing of the first supply of the first scan signals GB1 to GB10, which are provided twice in the first blank period BLKP1, does not overlap the second active period ACTP2, but the timing of the second supply thereof partially overlaps the second active period ACTP2, as described above with reference to FIG. 8A.

For example, because all of the timings of the first supply and the second supply of the first scan signals (e.g., GB1 to GB5) to the first to fifth pixel rows, among the ten pixel rows, correspond to the first blank period BLKP1, the on-bias power Vobs having the second voltage level Vob2 and the second initialization power Vint2 having the fourth voltage level VI2 may be supplied. Accordingly, the display panel 100 may be displayed with third luminance L3.

On the other hand, because the timing of the first supply of the first scan signals (e.g., GB6 to GB10) to the sixth to tenth pixel rows, among the ten pixel rows, corresponds to the first blank period BLKP1, the on-bias power Vobs having the second voltage level Vob2 and the second initialization power Vint2 having the fourth voltage level VI2 are supplied, but because the timing of the second supply of the first scan signals (e.g., GB6 to GB10) corresponds to the second active period ACTP2, the on-bias power Vobs having the 1_1-th voltage level Vob1_1 and the second initialization power Vint2 having the 3_1-th voltage level VI1_1 may be supplied. Accordingly, the display panel 100 may be displayed with fourth luminance L4, which is brighter than the third luminance L3. Accordingly, the luminance difference (or Half Mura) may be visibly recognized in the middle of the pixel rows included in the display panel 100 (e.g., the sixth pixel row, among the ten pixel rows).

To decrease this luminance difference, the display device 1000 according to an embodiment may include dimming periods DIMP2 and DIMP2_1 in which the voltage of the on-bias power Vobs and the voltage of the second initialization power Vint2 gradually change when the first blank period BLKP1 is transitioned to the second active period ACTP2.

As illustrated in FIG. 8B, the voltage level of the on-bias power Vobs may gradually decrease from the second voltage level Vob2 to the 1_1-th voltage level Vob1_1 for the second dimming period DIMP2. For example, the on-bias power Vobs may include a 1_11-th voltage level Vob1_11, a 1_12-th voltage level Vob1_12, a 1_13-th voltage level Vob1_13, a 1_14-th voltage level Vob1_14, and a 1_15-th voltage level Vob1_15 for the second dimming period DIMP2. Here, the 1_11-th voltage level Vob1_11, the 1_12-th voltage level Vob1_12, the 1_13-th voltage level Vob1_13, the 1_14-th voltage level Vob1_14, and the 1_15-th voltage level Vob1_15 may be decreasing voltage levels in the order in which they are listed.

The second dimming period DIMP2 according to an embodiment may correspond to half the second active period ACTP2, and the voltage level of the on-bias power Vobs may decrease based on a preset voltage width W and a preset voltage magnitude Vstp. For example, the voltage width W may be set by taking one horizontal period 1H as the basic unit (e.g., 1H, 2H, 3H and the like), and the voltage magnitude Vstp may be set based on the following Equation (5):

$$Vstp = Vob2 - Vob1\_1)/(L\_ACTP/(2*W)+1) \quad \text{Eq. (5)}$$

where Vstp denotes the voltage magnitude, Vob1_1 denotes the 1_1-th voltage level, Vob2 denotes the second voltage level, L_ACTP denotes the length of an active period, and W denotes the voltage width.

Also, the voltage level of the second initialization power Vint2 may gradually increase from the fourth voltage level VI2 to the 3_1-th voltage level VI1_1 for the 2_1-th dimming period DIMP2_1. For example, the second initialization power Vint2 may include a 3_11-th voltage level VI1_11, a 3_12-th voltage level VI1_12, a 3_13-th voltage level VI1_13, a 3_14-th voltage level VI1_14, and a 3_15-th voltage level VI1_15 for the 2_1-th dimming period DIMP2_1. Here, the 3_11-th voltage level VI1_11, the 3_12-th voltage level VI1_12, the 3_13-th voltage level VI1_13, the 3_14-th voltage level VI1_14, and the 3_15-th voltage level VI1_15 may be increasing voltage levels in the order in which they are listed.

The 2_1-th dimming period DIMP2_1 according to an embodiment may correspond to half the second active period ACTP2, and the voltage level of the second initialization power Vint2 may increase based on a preset voltage width W' and a preset voltage magnitude Vstp'. For example, the voltage width W' may be set by taking one horizontal period 1H as the basic unit (e.g., 1H, 2H, 3H and the like), and the voltage magnitude Vstp' may be set based on the following Equation (6):

$$Vstp' = (VI1\_1 - VI2)/(L\_ACTP/(2*W')+1) \quad \text{Eq. (6)}$$

where Vstp' denotes the voltage magnitude, VI1_1 denotes the 3_1-th voltage level, VI2 denotes the fourth voltage level, L_ACTP denotes the length of an active period, and W' denotes the voltage width.

Accordingly, the luminance difference (or Half Mura) is gradually changed in the middle of the pixel rows included in the display panel 100 (e.g., the sixth pixel row, among the ten pixel rows), as illustrated in FIG. 8C (b), whereby the luminance difference may be prevented from being visibly recognized.

For example, because all of the timings of the first supply and the second supply of the first scan signals (e.g., GB1 to GB5) to the first to fifth pixel rows, among the ten pixel rows, correspond to the first blank period BLKP1, the on-bias power Vobs having the second voltage level Vob2 and the second initialization power Vint2 having the fourth voltage level VI2 may be supplied. Accordingly, the display panel 100 may be displayed with the third luminance L3.

In some embodiments, because the timing of the first supply of the first scan signals (e.g., GB6 to GB10) to the sixth to tenth pixel rows, among the ten pixel rows, corresponds to the first blank period BLKP1, the on-bias power Vobs having the second voltage level Vob2 and the second initialization power Vint2 having the fourth voltage level VI2 are supplied, but the timing of the second supply of the first scan signals (e.g., GB6 to GB10) corresponds to the dimming periods DIMP2 and DIMP2_1. Accordingly, in the case of the sixth pixel row, the on-bias power Vobs having the 1_11-th voltage level Vob1_11 and the second initialization power Vint2 having the 3_11-th voltage level VI1_11 are supplied thereto, the display panel 100 may be displayed with the 4_1-th luminance L4_1, which is brighter than the third luminance L3, in the sixth pixel row. In the case of the seventh pixel row, the on-bias power voltage Vobs having the 1_12-th voltage level Vob1_12 and the second initialization power Vint2 having the 3_12-th voltage level VI1_12 are supplied thereto, the display panel 100 may be displayed with the 4_2-th luminance L4_2, which is brighter than the 4_1-th luminance L4_1, in the seventh pixel row. In the case of the eighth pixel row, the on-bias power Vobs having the 1_13-th voltage level Vob1_13 and the second initialization power Vint2 having the 3_13-th voltage level VI1_13 are supplied thereto, the display panel 100 may be displayed with the 4_3-th luminance L4_3, which is brighter than the 4_2-th luminance L4_2, in the eighth pixel row. In the case of the ninth pixel row, the on-bias power Vobs having the 1_14-th voltage level Vob1_14 and the second initialization power Vint2 having the 3_14-th voltage level VI1_14 are supplied thereto, the display panel 100 may be displayed with the 4_4-th luminance L4_4, which is brighter than the 4_3-th luminance L4_3, in the ninth pixel row. In the case of the tenth pixel row, the on-bias power Vobs having the 1_15-th voltage level Vob1_15 and the second initialization power Vint2 having the 3_15-th voltage level VI1_15 are supplied thereto, the display panel 100 may be displayed with the 4_5-th luminance L4_5, which is brighter than the 4_4-th luminance L4_4, in the tenth pixel row.

As described above, from the middle of the pixel rows included in the display panel 100 (e.g., from the sixth pixel row, among the ten pixel rows), the luminance is gradually changed (e.g., increased) from the 4_1-th luminance L4_1 to the 4_5-th luminance L4_5, whereby the luminance difference (or Half Mura) may be prevented from being visibly recognized. In FIG. 8Cb, the display panel 100 is illustrated on the assumption that the display panel 100 includes ten pixel rows for convenience of description, but the display panel 100 includes more pixel rows as the resolution of the display device 1000 is higher, as described above. Also, in response thereto, the voltage of the on-bias power Vobs and the voltage of the second initialization power Vint2 included in the dimming periods DIMP2 and DIMP2_1 are divided into levels with a smaller level difference, but the luminance difference between the pixel rows may be decreased more.

Figure 9A:
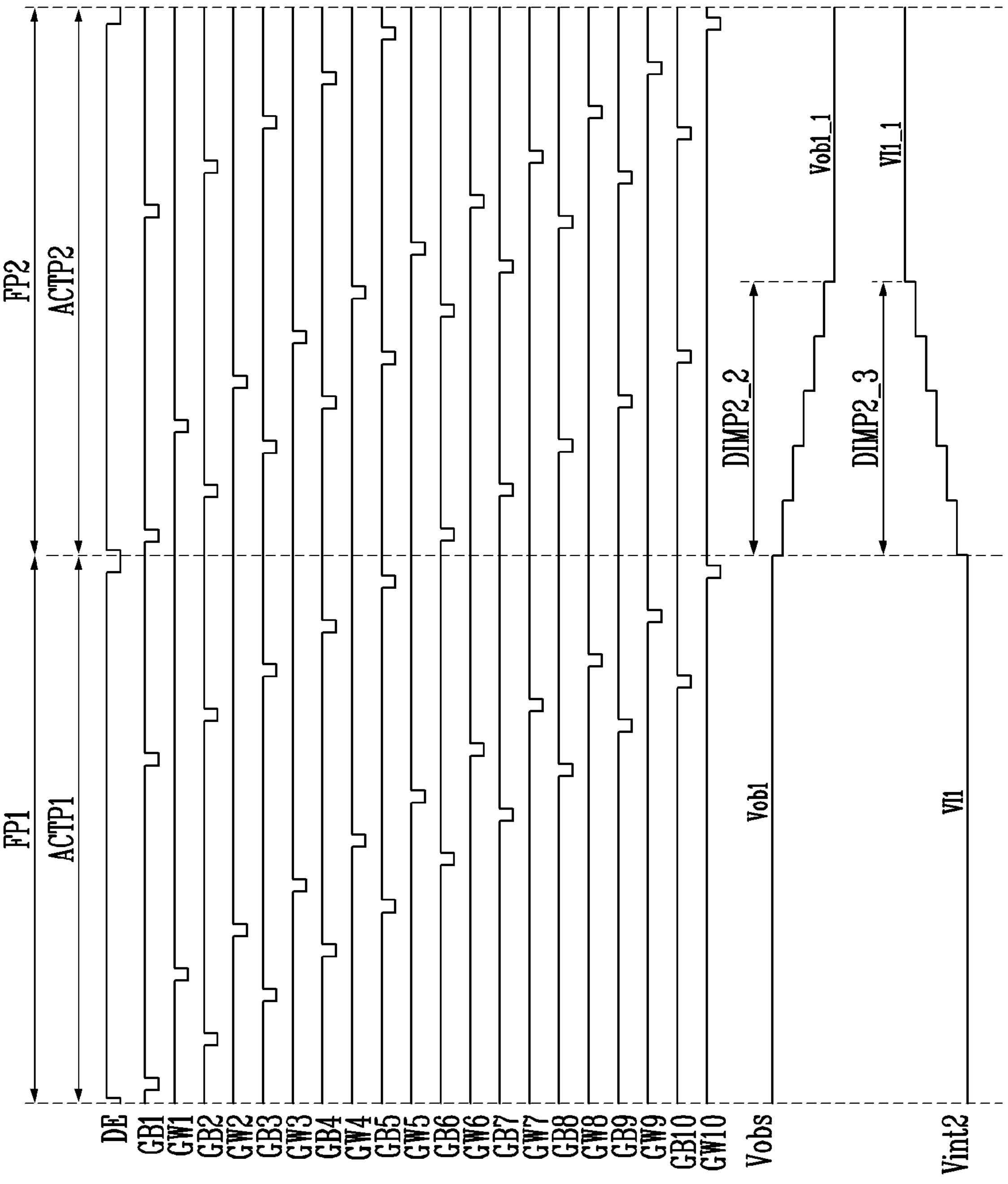
FIG. 9A is a timing diagram illustrating an example of an on-bias power voltage and a second initialization power voltage supplied to the pixel of FIG. 3 according to an embodiment.
Figure 9B:
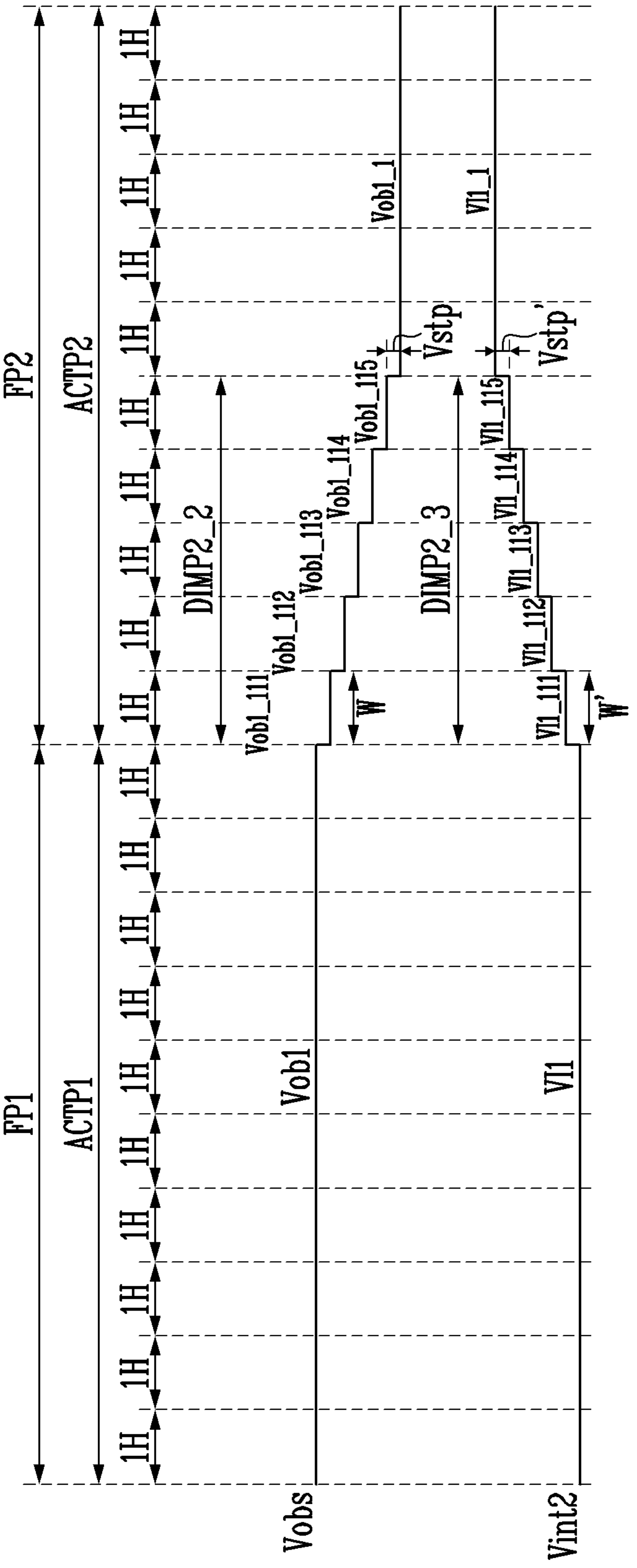
FIG. 9B is a timing diagram for explaining the on-bias power voltage and the second initialization power voltage of FIG. 9A according to an embodiment.

FIG. 9A is a timing diagram illustrating an example of an on-bias power voltage and a second initialization power voltage supplied to the pixel of FIG. 3 according to an embodiment. FIG. 9B is a timing diagram for explaining the on-bias power voltage and the second initialization power voltage of FIG. 9A according to an embodiment. Here, the display device 1000 is assumed to have ten pixel rows for convenience of description. However, the number of pixel rows in the display device 1000 is not limited thereto. For example, when the resolution of the display device 1000 is Full High Definition (FHD), the number of pixel rows may be 1080, and when the resolution thereof is Ultra High Definition (UHD), the number of pixel rows may be 2160.

Embodiments described in association with FIGS. 9A and 9B pertain to a change in the voltage of on-bias power Vobs and a change in the voltage of second initialization power Vint2 at the time of transition from the first active period ACTP1 of a first frame period FP1 to the second active period ACTP2 of a second frame period FP2, when compared with the embodiments described in association with FIGS. 8A and 8B, which pertain to a change in the voltage of the on-bias power Vobs and a change in the voltage of the second initialization power Vint2 at the time of transition from the first blank period BLKP1 of the first frame period FP1 to the second active period ACTP2 of the second frame period FP2.

Referring to FIGS. 1, 4, 8A, and 9A, the first frame period FP1 according to an embodiment may include only a first active period ACTP1 in which a data signal is supplied to the display panel 100. In this case, the first active period ACTP1 of the first frame period FP1 may be connected to the following second active period ACTP2 of the second frame period FP2.

For instance, in each of the first and second active periods ACTP1 and ACTP2, the scan driver 200 may supply a first scan signal GBi through the first scan line S1*i* and supply a fourth scan signal GWi through the fourth scan line S4*i*. For example, the scan driver 200 may sequentially supply the first scan signals GB1 to GB10 to the respective pixel rows twice for each of the first and second active periods ACTP1 and ACTP2, and may sequentially supply the fourth scan signals GW1 to GW10 to the respective pixel rows once for each of the first and second active periods ACTP1 and ACTP2. Here, the timing of the first supply of the first scan signals GB1 to GB10, which are provided twice in the first active period ACTP1, does not overlap the following second active period ACTP2, but the timing of the second supply thereof may partially overlap the second active period ACTP2. For instance, the timing of the second supply of the first scan signals GB6 to GB10, which are supplied to the sixth to tenth pixel rows, among the first scan signals GB1 to GB10, may overlap the second active period ACTP2.

The power supply 500 may provide the on-bias power Vobs having the first voltage level Vob1 in the first active period ACTP1, and may provide the on-bias power Vobs having the 1_1-th voltage level Vob1_1, which is different from the first voltage level Vob1, in the second active period ACTP2. Here, the second active period ACTP2 following the first active period ACTP1 may include a 2_2-th dimming period DIMP2_2 in which the on-bias power Vobs gradually changes from the first voltage level Vob1 to the 1_1-th voltage level Vob1_1.

Also, the power supply 500 may provide the second initialization power Vint2 having the third voltage level VI1 in the first active period ACTP1, and may provide the second initialization power Vint2 having the 3_1-th voltage level VI1_1, which is different from the third voltage level VI1, in the second active period ACTP2. The second active period ACTP2 following the first active period ACTP1 may include a 2_3-th dimming period DIMP2_3 in which the second initialization power Vint2 gradually changes from the third voltage level VI1 to the 3_1-th voltage level VI1_1.

Referring to FIGS. 3 and 9B, the 1_1-th voltage level Vob1_1 of the on-bias power Vob according to an embodiment may be lower than the first voltage level Vob1 thereof. Also, the 3_1-th voltage level VI1_1 of the second initialization power Vint2 may be higher than the third voltage level VI1 thereof. However, without limitation thereto, the 1_1-th voltage level Vob1_1 of the on-bias power Vobs according to an embodiment may be higher than the first voltage level Vob1 thereof, and the 3_1-th voltage level VI1_1 of the second initialization power Vint2 may be lower than the third voltage level VI1 thereof.

When the voltage of the on-bias power Vobs and/or the voltage of the second initialization power Vint2 rapidly change(s) without a dimming period (e.g., DIMP2_2 or DIMP2_3) at the time of transition from the first active period ACTP1 to the second active period ACTP2, the luminance difference (or Half Mura) may be visibly recognized in the middle of the pixel rows included in the display panel 100 (e.g., the sixth pixel row, among the ten pixel rows), similar to what is illustrated in FIG. 8Ca.

This is because the timing of the first supply of the first scan signals GB1 to GB10, which are provided twice in the first active period ACTP1, does not overlap the second active period ACTP2, but the timing of the second supply thereof partially overlaps the second active period ACTP2, as described above with reference to FIG. 9A.

To decrease this luminance difference, the display device 1000 according to an embodiment may include dimming periods DIMP2_2 and DIMP2_3 in which the voltage of the on-bias power Vobs and the voltage of the second initialization power Vint2 gradually change when the first active period ACTP1 is transitioned to the second active period ACTP2.

As illustrated in FIG. 9B, the voltage level of the on-bias power Vobs may gradually decrease from the first voltage level Vob1 to the 1_1-th voltage level Vob1_1 for the 2_2-th dimming period DIMP2_2. For example, the on-bias power Vobs may include a 1_111-th voltage level Vob1_111, a 1_112-th voltage level Vob1_112, a 1_113-th voltage level Vob1_113, a 1_114-th voltage level Vob1_114, and a 1_115-th voltage level Vob1_115 for the 2_2-th dimming period DIMP2_2. Here, the 1_111-th voltage level Vob1_111, the 1_112-th voltage level Vob1_112, the 1_113-th voltage level Vob1_113, the 1_114-th voltage level Vob1_114, and the 1_115-th voltage level Vob1_115 may be decreasing voltage levels in the order in which they are listed.

The 2_2-th dimming period DIMP2_2 according to an embodiment may correspond to half the second active period ACTP2, and the voltage level of the on-bias power Vobs may decrease based on a preset voltage width W and a preset voltage magnitude Vstp. For example, the voltage width W may be set by taking one horizontal period 1H as the basic unit (e.g., 1H, 2H, 3H and the like), and the voltage magnitude Vstp may be set based on the following Equation (7):

$$Vstp = (Vob1 - \mathrm{Vob1\_1})/(\mathrm{L\_ACTP}/(2*W)+1) \quad \text{Eq. (7)}$$

where Vstp denotes the voltage magnitude, Vob1 denotes the first voltage level, Vob1_1 denotes the 1_1-th voltage level, L_ACTP denotes the length of an active period, and W denotes the voltage width.

Also, the voltage level of the second initialization power Vint2 may gradually increase from the third voltage level VI1 to the 3_1-th voltage level VI1_1 for the 2_3-th dimming period DIMP2_3. For example, the second initialization power Vint2 may include a 3_111-th voltage level VI1_111, a 3_112-th voltage level VI1_112, a 3_113-th voltage level VI1_113, a 3_114-th voltage level VI1_114, and a 3_115-th voltage level VI1_115 for the 2_3-th dimming period DIMP2_3. Here, the 3_111-th voltage level VI1_111, the 3_112-th voltage level VI1_112, the 3_113-th voltage level VI1_113, the 3_114-th voltage level VI1_114, and the 3_115-th voltage level VI1_115 may be increasing voltage levels in the order in which they are listed.

The 2_3-th dimming period DIMP2_3 according to an embodiment may correspond to half the second active period ACTP2, and the voltage level of the second initialization power Vint2 may increase based on a preset voltage width W' and a preset voltage magnitude Vstp'. For example, the voltage width W' may be set by taking one horizontal period 1H as the basic unit (e.g., 1H, 2H, 3H and the like), and the voltage magnitude Vstp' may be set based on the following Equation (8):

$$Vstp' = (\mathrm{VI1\_1} - VI1)/(\mathrm{L\_ACTP}/(2*W')+1) \quad \text{Eq. (8)}$$

where Vstp' denotes the voltage magnitude, VI1 denotes the third voltage level, VI1_1 denotes the 3_1-th voltage level, L_ACTP denotes the length of an active period, and W' denotes the voltage width.

Accordingly, the luminance difference (or Half Mura) is gradually changed in the middle of the pixel rows included in the display panel 100 (e.g., the sixth pixel row, among the ten pixel rows), whereby the luminance difference may be prevented from being visibly recognized, similar to what is illustrated in FIG. 8Cb.

Figure 10:
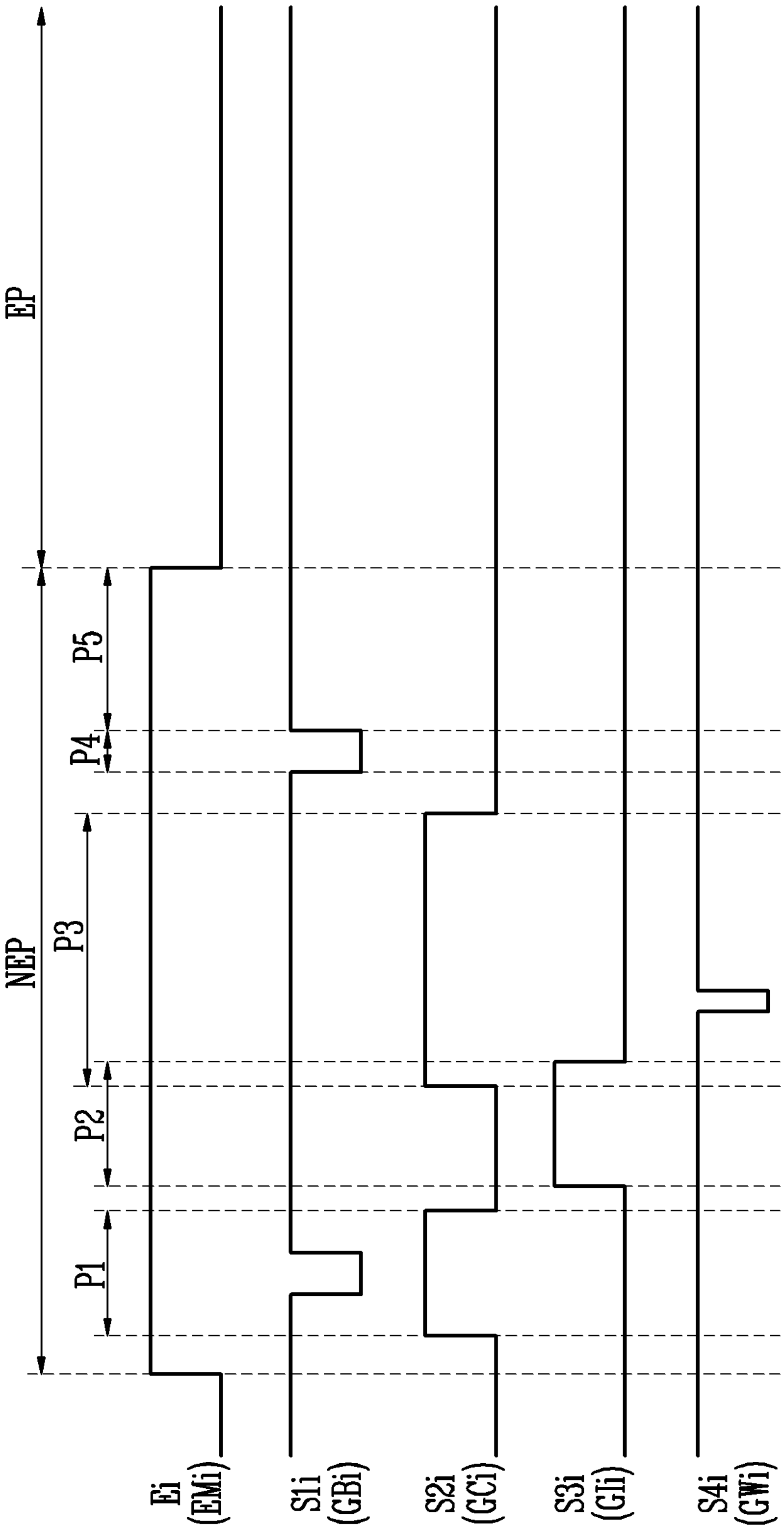
FIG. 10 is a timing diagram illustrating an example of signals supplied to the pixel of FIG. 3 according to an embodiment.
Figure 11:
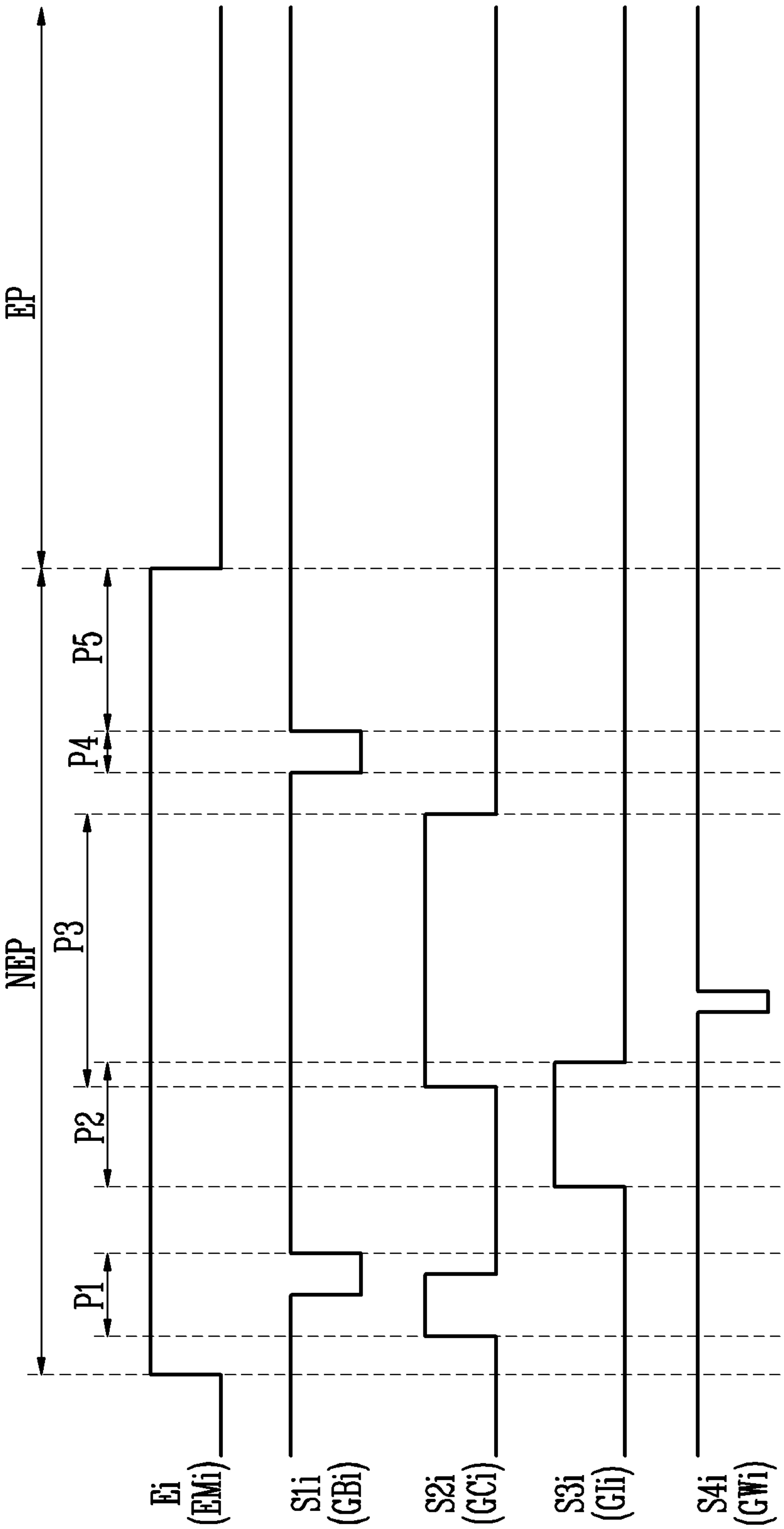
FIG. 11 is a timing diagram illustrating an example of signals supplied to the pixel of FIG. 3 according to an embodiment.

FIG. 10 is a timing diagram illustrating an example of signals supplied to the pixel of FIG. 3 according to an embodiment. FIG. 11 is a timing diagram illustrating an example of signals supplied to the pixel of FIG. 3 according to an embodiment.

The timing diagrams of FIGS. 10 and 11 are the same as or similar to the timing diagram of FIG. 4, except for the widths of some scan signals and the supply timing thereof. Accordingly, the same reference numerals are used to designate the same or corresponding components, and a repeated description will be omitted.

Referring to FIGS. 3, 10, and 11, the non-emission period NEP of an active period may include first to fifth periods P1 to P5.

In an embodiment, the second period P2 and the third period P3 may partially overlap each other, as illustrated in FIG. 10. For example, in the state in which the seventh transistor M7 is turned on in response to the third scan signal GIi, the third transistor M3 may be turned on in response to the second scan signal GCi. Because the third node N3 is in the state in which the voltage of the first initialization power Vint1 has been already supplied thereto and because the first transistor M1 is in the on-bias state, the characteristics of the first transistor M1 caused by the supply of the signal of FIG. 10 may be similar to the characteristics of the first transistor M1 caused by the operations in the second period P2 and the third period P3 of FIG. 4.

In an embodiment, after the supply of the second scan signal GCi is stopped in the first period P1, the supply of the first scan signal GBi may be stopped, as illustrated in FIG. 11. In the first period P1, the fourth transistor M4 may be turned on after the third transistor M3 is turned on, and the fourth transistor M4 may be turned off after the third transistor M3 is turned off. In this case, because a voltage having a level similar to that of the voltage of the on-bias power Vobs is supplied to the second node N2, the characteristic of the first transistor M1 in the first period P1 of FIG. 11 may be similar to that in the first period P1 of FIG. 4.

As described above, some scan signals may be output with a predetermined margin depending on the waveform of clock signals supplied to the scan driver (200 in FIG. 1), the output characteristics of the circuit included in the scan driver (200 in FIG. 1), and the like.

Figure 12:
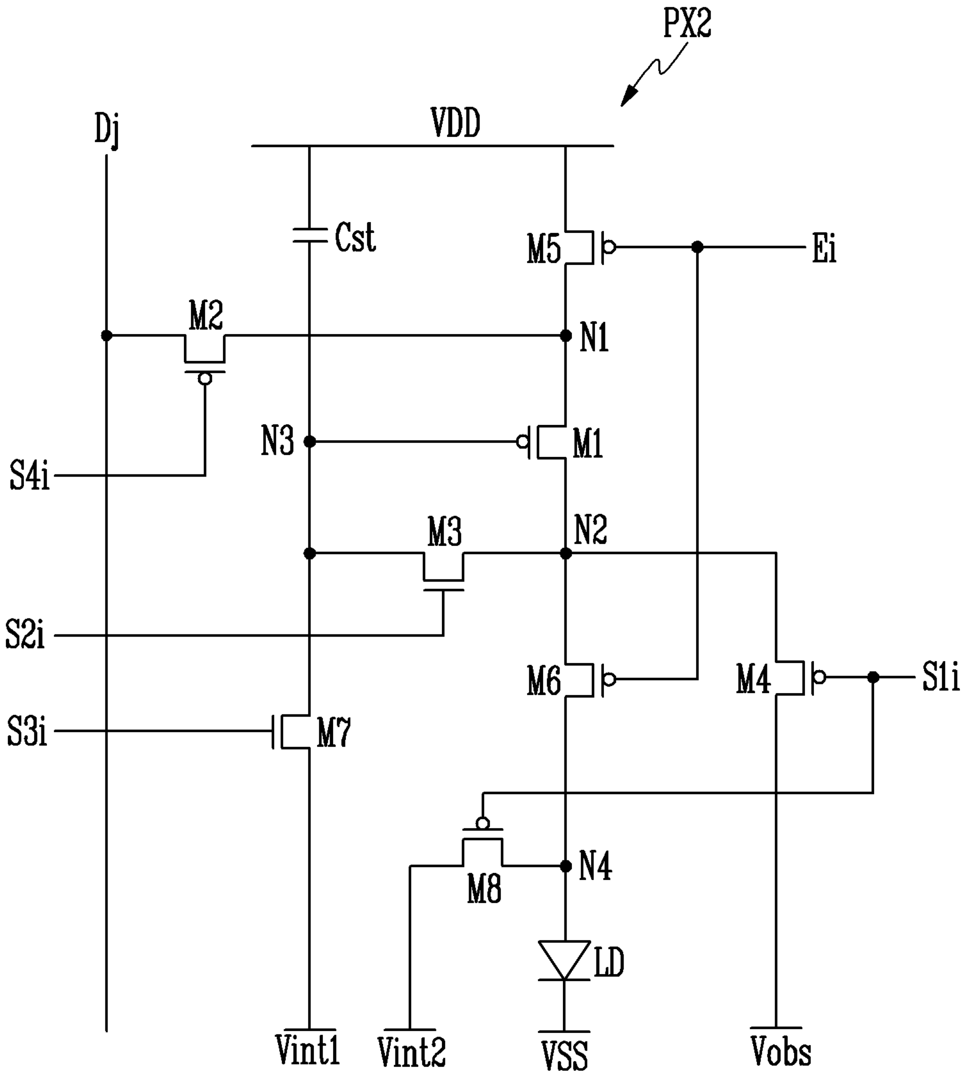
FIG. 12 is a circuit diagram illustrating an example of a pixel included in the display device of FIG. 1 according to an embodiment.

FIG. 12 is a circuit diagram illustrating an example of a pixel included in the display device of FIG. 1 according to an embodiment.

Because the pixel PX2 of FIG. 12 has the same configuration and operation as the pixel PX1 described with reference to FIG. 3, except for the fourth transistor M4, the same reference numerals are used to designate the same or corresponding components, and a repeated description will be omitted.

Referring to FIG. 12, the pixel PX2 may include a light-emitting element LD, first to eighth transistors M1 to M8, and a storage capacitor Cst.

In an embodiment, one electrode of the fourth transistor M4 may be coupled to a second node N2, and the other electrode thereof may be coupled to the source of on-bias power Vobs. The fourth transistor M4 may supply the voltage of the on-bias power Vobs to the second node N2 in response to a first scan signal supplied to a first scan line S1*i*. As described above, it does not matter which one of the source electrode and the drain electrode of the first transistor M1 is supplied with a voltage for an on-bias (for example, the pixel PX1 of FIG. 3 is configured such that the voltage for an on-bias is supplied to the source electrode of the first transistor M1, but the pixel PX2 of FIG. 12 is configured such that the voltage for an on-bias is supplied to the drain electrode of the first transistor M1).

A display device according to various embodiments applies the on-bias voltage (or the initialization voltage) of a first specific period (e.g., an active period) gradually change to the on-bias voltage (or the initialization voltage) of a second specific period (e.g., a blank period) by arranging a dimming period at the beginning of the second specific period when (or as) the first specific period is transitioned to the second specific period, whereby display quality degradation arising from the leakage current and/or a change in the hysteresis characteristic of a driving transistor may be prevented. However, the effects are not limited to the above-mentioned effects, and may be variously extended without departing from the spirit and scope of the disclosure.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A pixel, comprising:

a light-emitting element;

a first transistor coupled between a first node and a second node and including a gate electrode connected to a third node;

a second transistor coupled between a data line and the first node and including a gate electrode connected to a fourth scan line; and a fourth transistor including a gate electrode connected to a first scan line and configured to be turned on in response to a scan signal supplied to the first scan line to apply a voltage of on-bias power to the first transistor, wherein a first frame period comprises a first active period and a first blank period following the first active period and comprising a first dimming period, and wherein the voltage level of the on-bias power gradually increases in the first dimming period.

2. The pixel according to claim 1, wherein:

the voltage level of the on-bias power is higher in the first blank period than in the first active period.

3. The pixel according to claim 2, wherein:

the first frame period further comprises a second blank period following the first blank period; and the voltage level of the on-bias power is higher in the second blank period than in the first blank period.

4. The pixel according to claim 3, wherein:

second blank period comprises a second dimming period; and the voltage level of the on-bias power gradually increases in the second dimming period.

5. The pixel according to claim 1, wherein:

a second frame period comprises a second active period following the first blank period; and the voltage level of the on-bias power is lower in the second active period than in the first blank period.

6. The pixel according to claim 5, wherein:

the second active period comprises a second dimming period; and the voltage level of the on-bias power gradually decreases in the second dimming period.

7. The pixel according to claim 1, wherein:

a first frame period comprises a first active period;

a second frame period comprises a second active period following the first active period; and the voltage level of the on-bias power is lower in the second active period than in the first active period.

8. The pixel according to claim 7, wherein:

the second active period comprises the first dimming period; and the voltage level of the on-bias power gradually decreases in the first dimming period.

9. The pixel according to claim 1, wherein the pixel further comprises:

a third transistor coupled between the second node and the third node and including a gate electrode connected to a second scan line;

a fifth transistor coupled between the first node and driving power and including a gate electrode connected to an emission control line;

a sixth transistor coupled between the second node and a fourth node and including a gate electrode connected to the emission control line;

a seventh transistor coupled between the third node and first initialization power and including a gate electrode connected to a third scan line; and an eighth transistor coupled between the fourth node and second initialization power and including a gate electrode connected to the first scan line, wherein the fourth transistor is coupled between the first node and the on-bias power.

10. The pixel according to claim 1, wherein the pixel further comprises:

a third transistor coupled between the second node and the third node and including a gate electrode connected to a second scan line;

a fifth transistor coupled between the first node and driving power and including a gate electrode connected to an emission control line;

a sixth transistor coupled between the second node and a fourth node and including a gate electrode connected to the emission control line;

a seventh transistor coupled between the third node and first initialization power and including a gate electrode connected to a third scan line; and an eighth transistor coupled between the fourth node and second initialization power and including a gate electrode connected to the first scan line, wherein the fourth transistor is coupled between the second node and the on-bias power.

11. A pixel, comprising:

a light-emitting element;

a first transistor coupled between a first node and a second node and including a gate electrode connected to a third node;

a second transistor coupled between a data line and the first node and including a gate electrode connected to a fourth scan line; and an eighth transistor coupled between a fourth node and second initialization power and including a gate electrode connected to a first scan line, wherein a first frame period comprises a first active period and a first blank period following the first active period and comprising a first dimming period, and wherein the voltage level of the second initialization power gradually decreases in the first dimming period.

12. The pixel according to claim 11, wherein:

the voltage level of the second initialization power is lower in the first blank period than in the first active period.

13. The pixel according to claim 12, wherein:

the first frame period further comprises a second blank period following the first blank period; and the voltage level of the second initialization power is lower in the second blank period than in the first blank period.

14. The pixel according to claim 13, wherein:

second blank period comprises a second dimming period; and the voltage level of the second initialization power gradually decreases in the second dimming period.

15. The pixel according to claim 11, wherein:

a second frame period comprises a second active period following the first blank period; and the voltage level of the second initialization power is higher in the second active period than in the first blank period.

16. The pixel according to claim 15, wherein:

the second active period comprises a second dimming period; and the voltage level of the second initialization power gradually increases in the second dimming period.

17. The pixel according to claim 11, wherein:

a first frame period comprises a first active period;

a second frame period comprises a second active period following the first active period; and the voltage level of the second initialization power is higher in the second active period than in the first active period.

18. The pixel according to claim 17, wherein:

the second active period comprises the first dimming period; and the voltage level of the second initialization power gradually increases in the first dimming period.

19. The pixel according to claim 11, wherein the pixel further comprises:

a third transistor coupled between the second node and the third node and including a gate electrode connected to a second scan line;

a fourth transistor coupled between the first node and on-bias power and including a gate electrode connected to the first scan line;

a fifth transistor coupled between the first node and driving power and including a gate electrode connected to an emission control line;

a sixth transistor coupled between the second node and a fourth node and including a gate electrode connected to the emission control line; and a seventh transistor coupled between the third node and first initialization power and including a gate electrode connected to a third scan line.

20. The pixel according to claim 11, wherein the pixel further comprises:

a third transistor coupled between the second node and the third node and including a gate electrode connected to a second scan line;

a fourth transistor coupled between the second node and on-bias power and including a gate electrode connected to the first scan line;

a fifth transistor coupled between the first node and driving power and including a gate electrode connected to an emission control line;

a sixth transistor coupled between the second node and a fourth node and including a gate electrode connected to the emission control line; and a seventh transistor coupled between the third node and first initialization power and including a gate electrode connected to a third scan line.

* * * * *